US008578410B2

(12) United States Patent
Swart et al.

(10) Patent No.: US 8,578,410 B2
(45) Date of Patent: *Nov. 5, 2013

(54) VIDEO AND DIGITAL MULTIMEDIA AGGREGATOR CONTENT CODING AND FORMATTING

(75) Inventors: William D. Swart, Fairfax, VA (US); John S. McCoskey, Castle Rock, CO (US); Michael L. Asmussen, Oak Hill, VA (US)

(73) Assignee: Comcast IP Holdings, I, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/971,033

(22) Filed: Dec. 17, 2010

(65) Prior Publication Data

US 2011/0085080 A1  Apr. 14, 2011

Related U.S. Application Data

(63) Continuation of application No. 09/973,067, filed on Oct. 10, 2001, now Pat. No. 7,908,628, which is a continuation-in-part of application No. 09/920,723, filed on Aug. 3, 2001, now Pat. No. 7,793,326, and a continuation-in-part of application No. 09/920,615, filed on Aug. 3, 2001.

(51) Int. Cl.
*H04N 7/10* (2006.01)
*H04N 7/025* (2006.01)

(52) U.S. Cl.
USPC ............... 725/36; 725/32; 725/33; 725/34; 725/35

(58) Field of Classification Search
USPC .................................... 725/32–36
See application file for complete search history.

(56) References Cited

U.S. PATENT DOCUMENTS

| 3,639,686 A | 2/1972 | Walker et al. |
| 3,733,430 A | 5/1973 | Thompson et al. |
| 3,993,955 A | 11/1976 | Belcher et al. |
| 4,197,590 A | 4/1980 | Sukonick et al. |
| 4,225,884 A | 9/1980 | Block et al. |
| 4,264,924 A | 4/1981 | Freeman |
| 4,264,964 A | 4/1981 | Berger |
| 4,279,035 A | 7/1981 | Skerlos |

(Continued)

FOREIGN PATENT DOCUMENTS

| CA | 2414183 A1 | 12/2001 |
| DE | 3423846 A1 | 1/1986 |

(Continued)

OTHER PUBLICATIONS

Office Action in JP Application No. P2003-535456, dated Mar. 17, 2009, with translation.

(Continued)

*Primary Examiner* — Dominic D Saltarelli
(74) *Attorney, Agent, or Firm* — Banner & Witcoff, LLC

(57) ABSTRACT

A video and digital multimedia aggregator includes a content decoder, coder (codec) and formatter. The codec formatter receives coding and formatting requests that characterize input source content and desired output target content. Data conveyed about the source and target content may include parameters such as physical and/or logical addresses, coding and compression parameters, format descriptions, content size, description of auxiliary services, and other metadata elements that may be required for coding and formatting.

20 Claims, 10 Drawing Sheets

(56) References Cited

U.S. PATENT DOCUMENTS

| | | |
|---|---|---|
| 4,318,522 A | 3/1982 | Appleberry |
| 4,331,794 A | 5/1982 | D'Alelio et al. |
| 4,331,974 A | 5/1982 | Cogswell et al. |
| 4,334,245 A | 6/1982 | Michael |
| 4,361,848 A | 11/1982 | Poignet et al. |
| 4,381,522 A | 4/1983 | Lambert |
| 4,398,216 A | 8/1983 | Field et al. |
| 4,402,279 A | 9/1983 | Witte et al. |
| 4,450,481 A | 5/1984 | Dickinson |
| 4,451,701 A | 5/1984 | Bendig |
| 4,455,548 A | 6/1984 | Burnett |
| 4,455,570 A | 6/1984 | Saeki et al. |
| 4,484,217 A | 11/1984 | Block et al. |
| 4,484,218 A | 11/1984 | Boland et al. |
| 4,488,179 A | 12/1984 | Krüger et al. |
| 4,507,680 A | 3/1985 | Freeman |
| 4,509,198 A | 4/1985 | Nagatomi |
| 4,513,315 A | 4/1985 | Dekker et al. |
| 4,517,598 A | 5/1985 | Van Valkenburg et al. |
| 4,528,589 A | 7/1985 | Block et al. |
| 4,528,643 A | 7/1985 | Freeny, Jr. |
| D280,099 S | 8/1985 | Topp |
| 4,533,948 A | 8/1985 | McNamara et al. |
| 4,546,382 A | 10/1985 | McKenna et al. |
| 4,558,464 A | 12/1985 | O'Brien, Jr. |
| 4,573,072 A | 2/1986 | Freeman |
| 4,581,484 A | 4/1986 | Bendig |
| 4,587,520 A | 5/1986 | Astle |
| 4,602,278 A | 7/1986 | Pritchard et al. |
| 4,602,279 A | 7/1986 | Freeman |
| 4,605,964 A | 8/1986 | Chard |
| 4,621,282 A | 11/1986 | Ahern |
| 4,633,462 A | 12/1986 | Stifle et al. |
| 4,639,225 A | 1/1987 | Washizuka |
| 4,641,205 A | 2/1987 | Beyers, Jr. |
| 4,646,150 A | 2/1987 | Robbins et al. |
| 4,647,964 A | 3/1987 | Weinblatt |
| 4,658,290 A | 4/1987 | McKenna et al. |
| 4,665,559 A | 5/1987 | Benun |
| 4,673,976 A | 6/1987 | Wreford-Howard |
| 4,674,085 A | 6/1987 | Aranguren et al. |
| 4,677,685 A | 6/1987 | Kurisu |
| 4,688,218 A | 8/1987 | Blineau et al. |
| 4,688,246 A | 8/1987 | Eilers et al. |
| 4,691,340 A | 9/1987 | Maeda et al. |
| 4,694,490 A | 9/1987 | Harvey et al. |
| 4,695,880 A | 9/1987 | Johnson et al. |
| 4,695,975 A | 9/1987 | Bedrij |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,724,491 A | 2/1988 | Lambert |
| 4,739,510 A | 4/1988 | Jeffers et al. |
| 4,740,834 A | 4/1988 | Mobarry |
| 4,745,479 A | 5/1988 | Waehner |
| 4,747,785 A | 5/1988 | Roberts et al. |
| 4,751,578 A | 6/1988 | Reiter et al. |
| 4,775,935 A | 10/1988 | Yourick |
| 4,779,138 A | 10/1988 | Nomura et al. |
| RE32,776 E | 11/1988 | Saylor |
| 4,792,972 A | 12/1988 | Cook, Jr. |
| 4,797,568 A | 1/1989 | Gumbs |
| 4,797,918 A | 1/1989 | Lee |
| 4,802,008 A | 1/1989 | Walling |
| 4,805,014 A | 2/1989 | Sahara et al. |
| 4,816,901 A | 3/1989 | Music et al. |
| 4,816,904 A | 3/1989 | McKenna et al. |
| 4,825,200 A | 4/1989 | Evans et al. |
| 4,825,220 A | 4/1989 | Edward et al. |
| D301,037 S | 5/1989 | Matsuda |
| 4,829,372 A | 5/1989 | McCalley et al. |
| 4,829,558 A | 5/1989 | Welsh |
| 4,829,569 A | 5/1989 | Seth-Smith et al. |
| 4,835,607 A | 5/1989 | Keith |
| 4,845,662 A | 7/1989 | Tokumitsu |
| 4,860,379 A | 8/1989 | Schoeneberger |
| 4,876,736 A | 10/1989 | Kiewit |
| 4,885,775 A | 12/1989 | Lucas |
| 4,885,803 A | 12/1989 | Hermann et al. |
| 4,887,308 A | 12/1989 | Dutton |
| 4,888,638 A | 12/1989 | Bohn |
| 4,890,321 A | 12/1989 | Seth-Smith et al. |
| 4,896,354 A | 1/1990 | Inagaki et al. |
| 4,896,370 A | 1/1990 | Kasparian et al. |
| 4,907,082 A | 3/1990 | Richards |
| 4,918,516 A | 4/1990 | Freeman |
| 4,920,432 A | 4/1990 | Eggers et al. |
| 4,924,303 A | 5/1990 | Brandon et al. |
| 4,928,168 A | 5/1990 | Iwashita |
| 4,930,160 A | 5/1990 | Vogel |
| 4,931,872 A | 6/1990 | Stoddard et al. |
| 4,935,924 A | 6/1990 | Baxter |
| 4,943,963 A | 7/1990 | Waechter et al. |
| 4,947,429 A | 8/1990 | Bestler et al. |
| 4,949,187 A | 8/1990 | Cohen |
| 4,956,725 A | 9/1990 | Kozuki et al. |
| 4,959,810 A | 9/1990 | Darbee et al. |
| 4,961,109 A | 10/1990 | Tanaka |
| 4,965,825 A | 10/1990 | Harvey et al. |
| 4,974,252 A | 11/1990 | Osborne |
| 4,975,771 A | 12/1990 | Kassatly |
| 4,975,951 A | 12/1990 | Bennett |
| 4,977,455 A | 12/1990 | Young |
| 4,985,697 A | 1/1991 | Boulton |
| 4,985,761 A | 1/1991 | Adams |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,014,125 A | 5/1991 | Pocock et al. |
| 5,015,829 A | 5/1991 | Eilert et al. |
| 5,020,129 A | 5/1991 | Martin et al. |
| 5,027,400 A | 6/1991 | Baji et al. |
| 5,029,014 A | 7/1991 | Lindstrom |
| 5,029,232 A | 7/1991 | Nall |
| 5,036,394 A | 7/1991 | Morii et al. |
| 5,036,537 A | 7/1991 | Jeffers et al. |
| 5,038,402 A | 8/1991 | Robbins |
| 5,040,067 A | 8/1991 | Yamazaki |
| 5,046,093 A | 9/1991 | Wachob |
| 5,047,858 A | 9/1991 | Aimonoya |
| 5,047,867 A | 9/1991 | Strubbe et al. |
| 5,047,887 A | 9/1991 | Boshek |
| 5,049,990 A | 9/1991 | Kondo et al. |
| 5,054,071 A | 10/1991 | Bacon |
| 5,055,924 A | 10/1991 | Skutta |
| 5,056,138 A | 10/1991 | Tyson, Sr. |
| 5,057,917 A | 10/1991 | Shalkauser et al. |
| 5,066,319 A | 11/1991 | Lippold |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,083,205 A | 1/1992 | Arai |
| 5,091,782 A | 2/1992 | Krause et al. |
| 5,093,718 A | 3/1992 | Hoarty et al. |
| 5,099,319 A | 3/1992 | Esch et al. |
| D325,581 S | 4/1992 | Schwartz |
| 5,103,314 A | 4/1992 | Keenan |
| 5,105,268 A | 4/1992 | Yamanouchi et al. |
| 5,115,309 A | 5/1992 | Hang |
| 5,115,426 A | 5/1992 | Spanke |
| 5,121,205 A | 6/1992 | Ng et al. |
| 5,124,980 A | 6/1992 | Maki |
| 5,130,792 A | 7/1992 | Tindell et al. |
| 5,130,794 A | 7/1992 | Ritchey |
| 5,132,789 A | 7/1992 | Ammon et al. |
| 5,132,992 A | 7/1992 | Yurt et al. |
| 5,133,079 A | 7/1992 | Ballantyne et al. |
| 5,134,712 A | 7/1992 | Yamamoto |
| 5,142,690 A | 8/1992 | McMullan, Jr. et al. |
| D329,238 S | 9/1992 | Grasso et al. |

(56) References Cited

U.S. PATENT DOCUMENTS

| | | |
|---|---|---|
| 5,144,445 A | 9/1992 | Higashitsutsumi |
| 5,144,663 A | 9/1992 | Kudelski et al. |
| 5,150,118 A | 9/1992 | Finkle et al. |
| 5,151,782 A | 9/1992 | Ferraro |
| 5,151,785 A | 9/1992 | Citta |
| 5,151,789 A | 9/1992 | Young |
| 5,152,011 A | 9/1992 | Schwob |
| 5,155,591 A | 10/1992 | Wachob |
| 5,161,012 A | 11/1992 | Choi |
| 5,161,019 A | 11/1992 | Emanuel |
| 5,166,886 A | 11/1992 | Molnar et al. |
| D331,760 S | 12/1992 | Renk, Jr. |
| 5,168,372 A | 12/1992 | Sweetser |
| 5,172,413 A | 12/1992 | Bradley et al. |
| 5,172,423 A | 12/1992 | France |
| 5,182,639 A | 1/1993 | Jutamulia et al. |
| 5,187,735 A | 2/1993 | Herrero Garcia et al. |
| 5,192,999 A | 3/1993 | Graczyk et al. |
| 5,195,022 A | 3/1993 | Hoppal et al. |
| 5,202,817 A | 4/1993 | Koenck et al. |
| 5,206,722 A | 4/1993 | Kwan |
| 5,206,929 A | 4/1993 | Langford et al. |
| 5,206,954 A | 4/1993 | Inoue et al. |
| 5,208,660 A | 5/1993 | Yoshida |
| 5,212,553 A | 5/1993 | Maruoka |
| 5,216,515 A | 6/1993 | Steele et al. |
| 5,221,962 A | 6/1993 | Backus et al. |
| 5,223,924 A | 6/1993 | Strubbe |
| 5,229,852 A | 7/1993 | Maietta et al. |
| 5,231,494 A | 7/1993 | Wachob |
| 5,231,516 A | 7/1993 | Kamon et al. |
| 5,233,654 A | 8/1993 | Harvey et al. |
| 5,235,328 A | 8/1993 | Kurita |
| 5,235,419 A | 8/1993 | Krause |
| 5,236,199 A | 8/1993 | Thompson, Jr. |
| 5,237,311 A | 8/1993 | Mailey et al. |
| 5,237,610 A | 8/1993 | Gammie et al. |
| 5,241,428 A | 8/1993 | Goldwasser et al. |
| 5,241,659 A | 8/1993 | Parulski et al. |
| 5,247,347 A | 9/1993 | Litteral et al. |
| 5,247,575 A | 9/1993 | Sprague et al. |
| 5,251,324 A | 10/1993 | McMullan, Jr. |
| 5,253,066 A | 10/1993 | Vogel |
| 5,253,275 A | 10/1993 | Yurt |
| 5,253,341 A | 10/1993 | Rozmanith et al. |
| 5,255,086 A | 10/1993 | McMullan, Jr. et al. |
| D341,383 S | 11/1993 | London et al. |
| 5,260,778 A | 11/1993 | Kauffman et al. |
| 5,260,788 A | 11/1993 | Takano et al. |
| 5,270,809 A | 12/1993 | Gammie |
| 5,282,028 A | 1/1994 | Johnson et al. |
| 5,283,561 A | 2/1994 | Lumelsky et al. |
| 5,283,639 A | 2/1994 | Esch et al. |
| 5,285,272 A | 2/1994 | Bradley et al. |
| 5,289,271 A | 2/1994 | Watson |
| 5,289,288 A | 2/1994 | Silverman et al. |
| 5,293,540 A | 3/1994 | Trani et al. |
| 5,293,633 A | 3/1994 | Robbins |
| 5,303,361 A | 4/1994 | Colwell et al. |
| 5,307,173 A | 4/1994 | Yuen et al. |
| 5,307,481 A | 4/1994 | Shimazaki et al. |
| 5,311,423 A | 5/1994 | Clark |
| 5,311,425 A | 5/1994 | Inada |
| 5,315,584 A | 5/1994 | Savary et al. |
| 5,317,391 A | 5/1994 | Banker |
| 5,319,455 A | 6/1994 | Hoarty et al. |
| 5,319,707 A | 6/1994 | Wasilewski et al. |
| 5,323,240 A | 6/1994 | Amano et al. |
| 5,327,554 A | 7/1994 | Palazzi, III et al. |
| 5,329,590 A | 7/1994 | Pond |
| 5,335,313 A | 8/1994 | Douglas |
| 5,339,239 A | 8/1994 | Manabe et al. |
| 5,339,315 A | 8/1994 | Maeda et al. |
| 5,341,166 A | 8/1994 | Garr et al. |
| 5,341,426 A | 8/1994 | Barney et al. |
| 5,341,474 A | 8/1994 | Gelman et al. |
| 5,343,239 A | 8/1994 | Lappington et al. |
| 5,343,516 A | 8/1994 | Callele et al. |
| 5,345,594 A | 9/1994 | Tsuda |
| 5,347,304 A | 9/1994 | Moura et al. |
| 5,349,638 A | 9/1994 | Pitroda et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,361,091 A | 11/1994 | Hoarty et al. |
| 5,365,265 A | 11/1994 | Shibata et al. |
| 5,367,330 A | 11/1994 | Haave et al. |
| 5,367,571 A | 11/1994 | Bowen et al. |
| 5,374,951 A | 12/1994 | Welsh |
| 5,375,068 A | 12/1994 | Palmer et al. |
| 5,381,477 A | 1/1995 | Beyers, II et al. |
| 5,384,588 A | 1/1995 | Martin et al. |
| 5,386,241 A | 1/1995 | Park |
| 5,387,941 A | 2/1995 | Montgomery et al. |
| 5,389,964 A | 2/1995 | Oberle et al. |
| 5,390,348 A | 2/1995 | Magin et al. |
| 5,396,546 A | 3/1995 | Remillard |
| 5,398,074 A | 3/1995 | Duffield et al. |
| 5,400,401 A | 3/1995 | Wasilewski et al. |
| 5,404,393 A | 4/1995 | Remillard |
| 5,404,505 A | 4/1995 | Levinson |
| 5,408,258 A | 4/1995 | Kolessar |
| 5,410,326 A | 4/1995 | Goldstein |
| 5,410,344 A | 4/1995 | Graves et al. |
| 5,412,416 A | 5/1995 | Nemirofsky |
| 5,412,720 A | 5/1995 | Hoarty |
| 5,414,426 A | 5/1995 | O'Donnell et al. |
| 5,416,508 A | 5/1995 | Sakuma et al. |
| 5,421,031 A | 5/1995 | De Bey |
| 5,424,770 A | 6/1995 | Schmelzer et al. |
| 5,426,699 A | 6/1995 | Wunderlich et al. |
| 5,432,542 A | 7/1995 | Thibadeau et al. |
| 5,432,561 A | 7/1995 | Strubbe |
| 5,438,372 A | 8/1995 | Tsumori et al. |
| 5,440,632 A | 8/1995 | Bacon et al. |
| 5,442,389 A * | 8/1995 | Blahut et al. .................... 725/92 |
| 5,442,452 A | 8/1995 | Ryu |
| 5,442,626 A | 8/1995 | Wei |
| 5,446,490 A | 8/1995 | Blahut et al. |
| 5,446,919 A | 8/1995 | Wilkins |
| 5,448,313 A | 9/1995 | Kim et al. |
| 5,461,667 A | 10/1995 | Remillard |
| 5,467,144 A | 11/1995 | Saeger et al. |
| 5,467,402 A | 11/1995 | Okuyama et al. |
| 5,469,206 A | 11/1995 | Strubbe et al. |
| 5,473,362 A | 12/1995 | Fitzgerald et al. |
| 5,477,262 A | 12/1995 | Banker et al. |
| 5,477,263 A | 12/1995 | O'Callaghan et al. |
| 5,479,266 A | 12/1995 | Young et al. |
| 5,479,268 A | 12/1995 | Young et al. |
| 5,479,508 A | 12/1995 | Bestler et al. |
| 5,481,294 A | 1/1996 | Thomas et al. |
| 5,481,296 A | 1/1996 | Cragun et al. |
| 5,481,542 A | 1/1996 | Logston et al. |
| 5,483,277 A | 1/1996 | Granger |
| 5,483,278 A | 1/1996 | Strubbe et al. |
| 5,485,197 A | 1/1996 | Hoarty |
| 5,488,409 A | 1/1996 | Yuen et al. |
| 5,490,247 A | 2/1996 | Tung et al. |
| 5,493,568 A | 2/1996 | Sampat et al. |
| 5,493,677 A | 2/1996 | Balogh et al. |
| 5,497,187 A | 3/1996 | Banker et al. |
| 5,500,794 A | 3/1996 | Fujita et al. |
| 5,508,733 A | 4/1996 | Kassatly |
| 5,512,934 A | 4/1996 | Kochanski |
| 5,515,098 A | 5/1996 | Carles |
| 5,517,502 A | 5/1996 | Bestler et al. |
| 5,526,034 A | 6/1996 | Hoarty et al. |
| 5,528,281 A | 6/1996 | Grady et al. |
| 5,537,141 A | 7/1996 | Harper et al. |
| 5,537,153 A | 7/1996 | Shigihara |
| 5,539,449 A | 7/1996 | Blahut et al. |
| 5,539,871 A | 7/1996 | Gibson |

(56) References Cited

U.S. PATENT DOCUMENTS

| | | |
|---|---|---|
| 5,550,863 A | 8/1996 | Yurt |
| 5,557,316 A | 9/1996 | Hoarty et al. |
| 5,559,549 A | 9/1996 | Hendricks et al. |
| 5,561,708 A | 10/1996 | Remillard |
| 5,561,709 A | 10/1996 | Remillard |
| 5,570,126 A | 10/1996 | Blahut et al. |
| 5,579,522 A | 11/1996 | Christeson et al. |
| 5,583,560 A | 12/1996 | Florin et al. |
| 5,588,104 A | 12/1996 | Lanier et al. |
| 5,588,139 A | 12/1996 | Lanier et al. |
| 5,594,509 A | 1/1997 | Florin et al. |
| 5,600,364 A | 2/1997 | Hendricks |
| 5,600,368 A | 2/1997 | Matthews, III |
| 5,600,573 A | 2/1997 | Hendricks et al. |
| 5,600,775 A | 2/1997 | King et al. |
| 5,608,447 A | 3/1997 | Farry |
| 5,621,456 A | 4/1997 | Florin et al. |
| 5,621,793 A | 4/1997 | Bednarek et al. |
| 5,629,733 A | 5/1997 | Youman et al. |
| 5,630,103 A | 5/1997 | Smith et al. |
| 5,635,989 A | 6/1997 | Rothmuller |
| 5,636,346 A | 6/1997 | Saxe |
| 5,638,505 A | 6/1997 | Hemenway et al. |
| 5,640,196 A | 6/1997 | Behrens et al. |
| 5,644,354 A | 7/1997 | Thompson et al. |
| 5,659,350 A | 8/1997 | Hendricks et al. |
| 5,661,516 A | 8/1997 | Carles |
| 5,663,757 A | 9/1997 | Morales |
| 5,675,390 A | 10/1997 | Schindler et al. |
| 5,689,663 A | 11/1997 | Williams |
| 5,696,906 A | 12/1997 | Peters et al. |
| 5,703,965 A | 12/1997 | Fu et al. |
| 5,715,315 A | 2/1998 | Handelman |
| 5,721,956 A | 2/1998 | Martin et al. |
| 5,724,091 A | 3/1998 | Freeman et al. |
| 5,724,521 A | 3/1998 | Dedrick |
| 5,727,065 A | 3/1998 | Dillon |
| 5,729,471 A | 3/1998 | Jain et al. |
| 5,737,533 A | 4/1998 | de Hond |
| 5,737,725 A | 4/1998 | Case |
| 5,742,680 A | 4/1998 | Wilson |
| 5,744,170 A | 4/1998 | Hall |
| 5,745,556 A | 4/1998 | Ronen |
| 5,745,710 A | 4/1998 | Clanton, III et al. |
| 5,745,882 A | 4/1998 | Bixler et al. |
| 5,754,938 A | 5/1998 | Herz et al. |
| 5,758,257 A | 5/1998 | Herz |
| 5,764,276 A | 6/1998 | Martin et al. |
| 5,774,122 A | 6/1998 | Kojima et al. |
| 5,774,170 A | 6/1998 | Hite et al. |
| 5,787,171 A | 7/1998 | Kubota et al. |
| 5,793,872 A | 8/1998 | Hirayama et al. |
| 5,798,785 A | 8/1998 | Hendricks |
| 5,798,795 A | 8/1998 | Glenn et al. |
| 5,799,157 A | 8/1998 | Escallon |
| 5,805,204 A | 9/1998 | Thompson et al. |
| 5,805,677 A | 9/1998 | Ferry et al. |
| 5,806,061 A | 9/1998 | Chaudhuri et al. |
| 5,808,608 A | 9/1998 | Young et al. |
| 5,809,204 A | 9/1998 | Young et al. |
| 5,815,671 A | 9/1998 | Morrison |
| 5,818,441 A | 10/1998 | Throckmorton et al. |
| 5,818,511 A | 10/1998 | Farry |
| 5,819,301 A | 10/1998 | Rowe et al. |
| 5,829,733 A | 11/1998 | Becker |
| 5,833,468 A | 11/1998 | Guy et al. |
| 5,835,087 A | 11/1998 | Herz |
| 5,838,368 A | 11/1998 | Masunaga et al. |
| 5,844,600 A | 12/1998 | Kerr |
| 5,844,890 A | 12/1998 | Delp et al. |
| 5,848,396 A | 12/1998 | Gerace |
| 5,850,218 A | 12/1998 | LaJoie et al. |
| 5,855,020 A | 12/1998 | Kirsch |
| 5,864,546 A | 1/1999 | Campanella |
| 5,877,801 A | 3/1999 | Martin et al. |
| 5,880,769 A | 3/1999 | Nemirofsky et al. |
| 5,890,122 A | 3/1999 | Van Kleeck et al. |
| RE36,207 E | 5/1999 | Zimmermann et al. |
| 5,903,319 A | 5/1999 | Busko et al. |
| 5,909,638 A | 6/1999 | Allen |
| 5,917,537 A | 6/1999 | Lightfoot |
| 5,917,553 A | 6/1999 | Honey et al. |
| 5,917,915 A | 6/1999 | Hirose |
| 5,929,849 A | 7/1999 | Kikinis |
| 5,929,932 A | 7/1999 | Otsuki et al. |
| 5,940,073 A | 8/1999 | Klosterman et al. |
| 5,953,458 A | 9/1999 | Pirson et al. |
| 5,956,716 A | 9/1999 | Kenner et al. |
| 5,957,695 A | 9/1999 | Redford et al. |
| 5,983,176 A | 11/1999 | Hoffert |
| 5,986,690 A | 11/1999 | Hendricks |
| 5,990,927 A | 11/1999 | Hendricks et al. |
| 5,991,735 A | 11/1999 | Gerace |
| 6,006,225 A | 12/1999 | Bowman et al. |
| 6,016,141 A | 1/2000 | Knudson et al. |
| 6,025,637 A | 2/2000 | Mehta |
| 6,025,837 A | 2/2000 | Matthews, III et al. |
| 6,029,045 A | 2/2000 | Picco et al. |
| 6,031,680 A | 2/2000 | Chainer et al. |
| 6,052,717 A | 4/2000 | Reynolds et al. |
| 6,088,732 A | 7/2000 | Smith |
| 6,094,680 A | 7/2000 | Hokanson |
| 6,099,320 A | 8/2000 | Papadopoulos |
| 6,101,324 A | 8/2000 | Connell et al. |
| 6,119,154 A | 9/2000 | Weaver |
| 6,119,454 A | 9/2000 | Valisko |
| 6,138,147 A | 10/2000 | Weaver et al. |
| 6,141,693 A | 10/2000 | Perlman et al. |
| 6,144,944 A | 11/2000 | Kurtzman, II et al. |
| 6,154,633 A | 11/2000 | Landgraf et al. |
| RE36,988 E | 12/2000 | Johnson et al. |
| 6,163,316 A | 12/2000 | Killian |
| 6,166,778 A | 12/2000 | Yamamoto et al. |
| 6,177,931 B1 | 1/2001 | Alexander et al. |
| 6,178,446 B1 | 1/2001 | Gerszberg et al. |
| 6,182,028 B1 | 1/2001 | Karaali et al. |
| 6,182,050 B1 | 1/2001 | Ballard |
| 6,182,072 B1 | 1/2001 | Leak |
| 6,201,536 B1 | 3/2001 | Hendricks |
| 6,204,885 B1 | 3/2001 | Kwoh |
| 6,209,028 B1 * | 3/2001 | Walker et al. .................. 709/219 |
| 6,219,839 B1 | 4/2001 | Sampsell |
| 6,243,713 B1 | 6/2001 | Nelson et al. |
| 6,252,690 B1 | 6/2001 | Laine |
| 6,279,112 B1 | 8/2001 | O'Toole, Jr. et al. |
| 6,282,713 B1 | 8/2001 | Kitsukawa et al. |
| 6,286,006 B1 | 9/2001 | Bharat et al. |
| 6,288,753 B1 | 9/2001 | DeNicola et al. |
| 6,312,336 B1 | 11/2001 | Handelman et al. |
| 6,327,574 B1 | 12/2001 | Kramer et al. |
| 6,331,877 B1 | 12/2001 | Bennington |
| 6,370,543 B2 * | 4/2002 | Hoffert et al. .................. 725/113 |
| 6,446,261 B1 | 9/2002 | Rosser |
| 6,463,468 B1 | 10/2002 | Buch et al. |
| 6,463,585 B1 | 10/2002 | Hendricks et al. |
| 6,486,892 B1 | 11/2002 | Stern |
| 6,493,872 B1 | 12/2002 | Rangan et al. |
| 6,515,680 B1 | 2/2003 | Hendricks et al. |
| 6,530,082 B1 | 3/2003 | Del Sesto et al. |
| 6,539,548 B1 | 3/2003 | Hendricks et al. |
| 6,547,829 B1 | 4/2003 | Meyerzon |
| 6,618,717 B1 | 9/2003 | Karadimitriou et al. |
| 6,651,253 B2 | 11/2003 | Dudkiewicz et al. |
| 6,694,352 B1 | 2/2004 | Omoigui |
| 6,698,020 B1 | 2/2004 | Zigmond et al. |
| 6,751,612 B1 | 6/2004 | Schuetze |
| 6,772,150 B1 | 8/2004 | Whitman et al. |
| 6,839,705 B1 | 1/2005 | Grooters |
| 6,918,131 B1 * | 7/2005 | Rautila et al. .................... 725/34 |
| 6,973,436 B1 | 12/2005 | Shkedi |
| 7,075,919 B1 | 7/2006 | Wendt et al. |
| 7,082,427 B1 | 7/2006 | Seibel et al. |
| 7,143,430 B1 * | 11/2006 | Fingerman et al. ............. 725/87 |
| 7,150,031 B1 | 12/2006 | Rodriguez |

(56) References Cited

U.S. PATENT DOCUMENTS

| | | |
|---|---|---|
| 7,315,881 B2 | 1/2008 | Menez |
| 7,363,645 B1 | 4/2008 | Hendricks |
| 7,424,439 B1 | 9/2008 | Fayyad et al. |
| 7,505,919 B2 | 3/2009 | Richardson |
| 2001/0013123 A1 | 8/2001 | Freeman et al. |
| 2001/0027493 A1 | 10/2001 | Wallace |
| 2001/0027557 A1 | 10/2001 | Shinkawa et al. |
| 2001/0037498 A1 | 11/2001 | Johansson |
| 2001/0039546 A1 | 11/2001 | Moore et al. |
| 2002/0010682 A1 | 1/2002 | Johnson |
| 2002/0026496 A1 | 2/2002 | Boyer et al. |
| 2002/0032740 A1 | 3/2002 | Stern |
| 2002/0038308 A1 | 3/2002 | Cappi |
| 2002/0056129 A1 | 5/2002 | Blackketter et al. |
| 2002/0059610 A1 | 5/2002 | Ellis |
| 2002/0065812 A1 | 5/2002 | Keith |
| 2002/0087980 A1 | 7/2002 | Eldering et al. |
| 2002/0099697 A1 | 7/2002 | Jensen-Grey |
| 2002/0129062 A1 | 9/2002 | Luparello |
| 2003/0033299 A1 | 2/2003 | Sundaresan |
| 2004/0096110 A1* | 5/2004 | Yogeshwar et al. .......... 382/239 |
| 2004/0261127 A1 | 12/2004 | Freeman et al. |
| 2005/0138660 A1 | 6/2005 | Boyer et al. |
| 2005/0235200 A1 | 10/2005 | Goldberg |
| 2005/0235320 A1 | 10/2005 | Maze et al. |

FOREIGN PATENT DOCUMENTS

| | | | |
|---|---|---|---|
| DE | 3935294 A | | 4/1991 |
| DE | 4214184 A1 | | 11/1992 |
| DE | 19755742 A1 | | 6/1999 |
| EP | 103438 A1 | | 3/1984 |
| EP | 145063 A2 | | 6/1985 |
| EP | 149536 A2 | | 7/1985 |
| EP | 158548 A1 | | 10/1985 |
| EP | 0158767 A2 | | 10/1985 |
| EP | 167237 A2 | | 1/1986 |
| EP | 187961 A2 | | 7/1986 |
| EP | 243312 A2 | | 10/1987 |
| EP | 0277014 A2 | | 8/1988 |
| EP | 0281293 A2 | | 9/1988 |
| EP | 0299830 A1 | | 1/1989 |
| EP | 0314572 A2 | | 5/1989 |
| EP | 0328440 A1 | | 8/1989 |
| EP | 0340643 A2 | | 11/1989 |
| EP | 0355697 A2 | | 2/1990 |
| EP | 0377334 A2 | | 7/1990 |
| EP | 0390041 A2 | | 10/1990 |
| EP | 0396186 A1 | | 11/1990 |
| EP | 399200 A2 | | 11/1990 |
| EP | 0402809 A2 | | 12/1990 |
| EP | 0420123 A2 | | 4/1991 |
| EP | 0424648 A2 | | 5/1991 |
| EP | 425834 A2 | | 5/1991 |
| EP | 450841 A2 | | 10/1991 |
| EP | 0486989 A1 | | 5/1992 |
| EP | 0488379 A2 | | 6/1992 |
| EP | 0506435 A2 | | 9/1992 |
| EP | 0513553 A2 | | 11/1992 |
| EP | 513763 A2 | | 11/1992 |
| EP | 0570785 A1 | | 11/1993 |
| EP | 0586954 A2 | | 3/1994 |
| EP | 0620689 A1 | | 10/1994 |
| EP | 0646856 A2 | | 4/1995 |
| EP | 0691787 | | 1/1996 |
| EP | 0702491 A1 | | 3/1996 |
| EP | 0734157 A2 | | 9/1996 |
| EP | 0821522 A2 | | 1/1998 |
| EP | 0835915 A2 | | 4/1998 |
| EP | 0838798 A1 | | 4/1998 |
| EP | 0845904 A2 | | 6/1998 |
| EP | 0892388 A1 | | 1/1999 |
| EP | 0924629 A2 | | 6/1999 |
| EP | 0924687 A2 | | 6/1999 |
| EP | 0961490 | | 12/1999 |
| EP | 0961490 A2 | | 12/1999 |
| EP | 0992922 | | 4/2000 |
| EP | 1049305 | | 11/2000 |
| EP | 1133088 | | 9/2001 |
| EP | 1143728 | | 10/2001 |
| EP | 1444825 A2 | | 8/2004 |
| GB | 235095 A | | 6/1925 |
| GB | 2168227 A | | 6/1986 |
| GB | 2177873 A | | 1/1987 |
| GB | 2255214 A | | 10/1992 |
| GB | 2259830 A | | 3/1993 |
| GB | 2269302 A | | 2/1994 |
| GB | 2330429 | | 4/1999 |
| GB | 2343095 A | | 4/2000 |
| GB | 2353095 | | 4/2000 |
| GB | 2344009 A | | 5/2000 |
| GB | 2358938 | | 8/2001 |
| JP | 60143086 A | | 7/1985 |
| JP | 61-202587 A | | 9/1986 |
| JP | 01-020454 A | | 1/1989 |
| JP | 1130683 A | | 5/1989 |
| JP | 1142918 A | | 6/1989 |
| JP | 3029456 A | | 2/1991 |
| JP | 3114375 A | | 5/1991 |
| JP | 3198119 A | | 8/1991 |
| JP | 4233886 A | | 8/1992 |
| JP | 5250106 A | | 9/1993 |
| JP | 6-134489 A | | 5/1994 |
| JP | 6224777 A | | 8/1994 |
| JP | 7-235909 A | | 9/1995 |
| JP | 09227193 A | | 9/1997 |
| JP | 9-284571 A | | 10/1997 |
| JP | 2000-013779 | | 1/2000 |
| JP | 2001119681 | | 4/2001 |
| WO | 8000209 A1 | | 2/1980 |
| WO | 8801463 A1 | | 2/1988 |
| WO | 8909528 A1 | | 10/1989 |
| WO | 8912370 A1 | | 12/1989 |
| WO | 9010988 A1 | | 9/1990 |
| WO | 91/00670 A1 | | 1/1991 |
| WO | 9103112 A1 | | 3/1991 |
| WO | 9204801 A1 | | 3/1992 |
| WO | 9210040 A1 | | 6/1992 |
| WO | 9211713 A1 | | 7/1992 |
| WO | 9212599 A1 | | 7/1992 |
| WO | 92/17027 A1 | | 10/1992 |
| WO | 9221206 A1 | | 11/1992 |
| WO | 9311637 A1 | | 6/1993 |
| WO | 9322877 A2 | | 11/1993 |
| WO | 9407327 A1 | | 3/1994 |
| WO | 9413107 A1 | | 6/1994 |
| WO | 9414282 A1 | | 6/1994 |
| WO | 94/16527 A1 | | 7/1994 |
| WO | 9515658 A1 | | 6/1995 |
| WO | 96/08109 A1 | | 3/1996 |
| WO | 9617306 A2 | | 6/1996 |
| WO | 9625006 A1 | | 8/1996 |
| WO | 9641473 A1 | | 12/1996 |
| WO | 97/12486 A1 | | 4/1997 |
| WO | 9713368 A1 | | 4/1997 |
| WO | 9720274 A1 | | 6/1997 |
| WO | 9722110 A1 | | 6/1997 |
| WO | 9722112 A1 | | 6/1997 |
| WO | 9741688 A1 | | 11/1997 |
| WO | 9802836 A2 | | 1/1998 |
| WO | 9808344 A2 | | 2/1998 |
| WO | 9810997 A1 | | 3/1998 |
| WO | 9818086 A1 | | 4/1998 |
| WO | 9828906 A2 | | 7/1998 |
| WO | 9848566 A2 | | 10/1998 |
| WO | 9853581 A1 | | 11/1998 |
| WO | 99/14947 | | 3/1999 |
| WO | 99/17549 | | 4/1999 |
| WO | 9918701 A1 | | 4/1999 |
| WO | 99/26415 A1 | | 5/1999 |
| WO | 9945491 A1 | | 9/1999 |
| WO | 99/52285 A1 | | 10/1999 |
| WO | 99/66719 A1 | | 12/1999 |

(56) References Cited

FOREIGN PATENT DOCUMENTS

| WO | 00/08855 | 2/2000 |
|---|---|---|
| WO | 00/27122 | 5/2000 |
| WO | 00/28733 | 5/2000 |
| WO | 00/79794 | 12/2000 |
| WO | 0101689 | 1/2001 |
| WO | 0111874 A1 | 2/2001 |
| WO | 0118665 A1 | 3/2001 |
| WO | 0124083 A2 | 4/2001 |
| WO | 0167763 A1 | 9/2001 |
| WO | 0175649 A2 | 10/2001 |

OTHER PUBLICATIONS

Supplementary Partial EP Search Report in EP Application No. 02778473, dated Oct. 25, 2005.
Supplementary EP Search Report in EP Application No. 02784096, dated Oct. 13, 2005.
Written Opinion in PCT Application No. PCT/US02/32756, dated Aug. 13, 2004.
International Preliminary Examination Report in PCT Application No. PCT/US02/32756, dated Feb. 17, 2005.
Office Action in JP Application No. P2003-537297, dated Nov. 24, 2009, with translation.
Office Action in JP Application No. P2003-537297, dated Nov. 24 2009, with translation.
Supplementary EP Search Report in EP Application No. 02778472, dated Oct. 7, 2005.
Office Action in EP Application No. 02778472.7, dated Feb. 15, 2010.
Office Action in EP Application No. 02784096.6, dated Mar. 26, 2010.
Chadwick, Henry et al., "DAVIC-Digital Audio-Visual Council", TV Anytime and TV anywhere, Dec. 1999, pp. 1-140.
Brin, Sergey et al., "The Anatomy of a Large Scale Hypertextual Web Search Engine", Aug. 3, 3001, pp. 1-19.
Office Action in Canadian Patent Application No. 2462159, dated Aug. 2, 2010.
Office Action in U.S. Appl. No. 09/920,615, dated Apr. 11, 2011.
Office Action in Canadian Patent Application No. 2462161, dated Feb. 1, 2011.
European Office Action dated Jan. 30, 2012 in EP Application No. 02 778 473.5.
Notice of Reasons for Rejection dated Jan. 31, 2012 in Japanese Application No. P2009-188618 and English translation thereof.
Office Action in Canadian Patent Application No. 2,414,717, dated May 7, 2010.
Office Action in JP Application No. P2003-537297, dated Mar. 17, 2009, with translation.
Supplementary EP Search Report in EP Application No. 02 80 0962 dated Jul. 26, 2010.
Supplementary European Search Report for EP 02800962 dated Jul. 26. 2010.
Koenen, et al., "MPEG-4: Context and Objectives", Signal Processing Image Communication 9 (1997), pp. 295-304.
Examiner's Report for Canadian Application No. 2,462,160 dated Jan. 20, 2009.
Pereira, et al., "MGEG-4-0pening New Frontiers to Broadcast Services", EBU Technical Review, Spring 1999, pp. 28-35.
European Search Report for EP 02776187.3 dated Apr. 11, 2005.

* cited by examiner

VIDEO AND DIGITAL MULTIMEDIA AGGREGATOR CONTENT CODING AND FORMATTING

RELATED APPLICATIONS

This application is a continuation of patent application Ser. No. 09/973,067, entitled "Video And Digital Multimedia Aggregator Content Coding And Formatting," filed on Oct. 10, 2001, which is a continuation-in-part of patent application Ser. No. 09/920,723, entitled "Video and Digital Multimedia Aggregator," filed on Aug. 3, 2001 and patent application Ser. No. 09/920,615, entitled "Video and Digital Multimedia Aggregator Remote Content Crawler," filed on Aug. 3, 2001. These patent applications are hereby incorporated by reference.

The following U.S. patents also are incorporated by reference:

U.S. Pat. No. 5,798,785, entitled "Terminal for Suggesting Programs Offered on a Television Program Delivery System;"

U.S. Pat. No. 5,986,690, entitled "Electronic Book Selection and Delivery System;"

The following co-pending U.S. patent applications also are incorporated by reference:

patent application Ser. No. 07/991,074, filed Dec. 9, 1992, entitled "Remote Control for Menu Driven Subscriber Access to Television Programming;"

patent application Ser. No. 08/906,469, filed Aug. 5, 1997, entitled "Reprogrammable Terminal for Suggesting Programs Offered on a Television Program Delivery System;"

patent application Ser. No. 09/191,520, filed Nov. 13, 1998, entitled "Digital Broadcast Program Ordering;"

patent application Ser. No. 09/289,957, filed Apr. 13, 1999, entitled "Electronic Book Alternative Delivery Systems;"

patent application Ser. No. 09/289,956, filed Apr. 13, 1999, entitled "Electronic Book Alternative Delivery Methods;" and patent application entitled "Video and Digital Multimedia Aggregator;" and patent application entitled "Video and Digital Multimedia Aggregator Remote Content Crawler," filed on date herein.

TECHNICAL FIELD

The technical field is television program and digital multimedia delivery systems that incorporate intelligent and flexible program search and delivery mechanisms.

BACKGROUND

Cable television delivery systems greatly expanded the array of programs available to television viewers over that provided by over-the-air broadcast systems. Subsequently, satellite television delivery systems, and in particular, digital satellite broadcast systems further expanded the viewing choices for consumers. In the near future, digital broadcast television systems will provide many more programming choices for consumers.

In addition to television programming delivered through television program delivery systems, other programs and events may be sent to consumers. These other programs and events include streaming video sent over wired and unwired, narrowband to broadband services, digital audio programs, and other multimedia data.

Unfortunately, customers are still limited in their television viewing choices by the local and regional nature of television delivery systems. For example, a broadcaster in Boston may provide programming of local interests to people in Massachusetts while a broadcaster in Seattle may provide different programming to people in the Seattle area. A person in Boston generally cannot access Seattle programming, other than programming that is provided at a national level.

In addition to this local/regional market segregation, many other sources of programming and events may not be available in a specific viewing area. These other sources may include audio programming, streaming video, local or closed circuit television programming (e.g., education television programming provided by a state education department) and other programming.

Even if certain programming is available in a local viewing area, a viewer may not be aware of its existence. This situation may be the result of a large array of available programming coupled with a limited program menu or guide. The program guide may be limited in that not all available programming can be listed, some programming changes occur that are not reflected in the program guide, and errors may exist in the program guide. In addition, the more comprehensive the program guide, the harder it is for the viewer to search and navigate the program guide to find a desired program.

SUMMARY

The problems noted above are solved by the video and digital multimedia aggregator system and method described herein. Program content can be packaged and delivered by the system, including video, television, radio, audio, multimedia, computer software, and electronic books, or any content that can be delivered in digital format.

The aggregator comprises a request and results processing server, a search engine server coupled to the request and results processing server and a content acquisition server coupled to the request and results processing server. The request and results processing server receives a request for a program, the search engine server searches for the program and the content acquisition server acquires a program for delivery to the user. The request and results processing server includes a search request processor that receives information related to the user's search request and provides the information to a search results form builder that creates an electronic search request. The search request may be augmented by using a content search suggestion engine to add additional search terms and descriptions to the search request. The aggregator may also include a decoder that decodes program content and program metadata from remote sources for storage at the aggregator, and an encoder that encodes content metadata and programs for delivery to the user. The aggregator may also comprise one or more crawlers, such as a content crawler, to look for program content in the digital communications network.

The search engine server searches at least a local content database. The local database comprises at least two file types. A content file includes a complete program content file. For example, the 1997 movie *Titanic* may exist in the local content database as a complete program content file. The complete program content file may also include a reference content or metadata that contains additional information related to the content. Such additional information in the reference content may include: a program description, including program rating, program description, video clips, program length, format (e.g., 4×3 television or 16×9 movies), and other information; billing information and digital rights management information; viewing statistics, including number of times viewed, dates/times viewed, identity of users viewing the program; advertisement information to allow ads to be inserted during viewing of the program; and other information.

The additional information in the reference file may be provided in whole or in part to the system users. For example, the aggregator may provide a program description and accompanying video clips to selected systems users. The reference file may also be used by the aggregator for system administration purposes. For example, billing and digital rights management information may be used to collect appropriate fees from system users and to provide such collected fees to the entities owning rights in the content.

A remote content crawler continually crawls the digital communication network looking for content to provide to the aggregator. The content provided to the aggregator may be stored in a form of an entire content file. For example, the content may include an entire movie, television program or electronic book. Alternatively, the content provided to the aggregator may be a reference to a content file that is stored at, or that will be available at one of the remote locations. For example, the content may be a reference to a future, scheduled live sports event that will be made available to system users. The sports event may be provided for a one time fee, as part of a sports package, for which a fee is collected, or as a free event. In the examples discussed above, the content may be stored at the aggregator, and may subsequently be provided to system users. For the example of the live sports event, the aggregator may store the live sports event and may then provide the sports event as a replay, in addition to facilitating live viewing of the sports event.

To ensure the content is delivered to the correct addressee, in a format that is compatible with the addressee's equipment (i.e., hardware and software), the aggregator may include one or more content coders, decoders and formatters. In an embodiment, the coding, decoding and formatting functions may be executed by separate components, which may be embodied as hardware or software, or a combination of hardware and software. In another embodiment, two or more of the functions may be executed by a single device, comprising hardware and/or software.

In an embodiment, the formatting, decoding and coding functions are executed by a coder-decoder (codec) formatter. The codec formatter may comprise means for receiving a coding and formatting request, means for analyzing parameters contained in the coding and formatting request, means for decoding, formatting and coding target content, means for configuring the decoding, formatting and coding means, and means for routing coded target output content to one or more target addresses.

In another embodiment, the codec formatter may include means for processing auxiliary service requests. Such auxiliary service requests may be included in the coding and formatting request, or may be separately supplied. The auxiliary services may include closed captioning, descriptive video narration, alternative language audio, content rating, critical review information, device control and commands, future content schedules, advertising, targeted advertising, text and data services, interactive services, and content metadata. The means for processing auxiliary services includes means for analyzing the auxiliary service requests, means for configuring one or more auxiliary services processing means to supply the requested auxiliary services, and means for outputting the requested auxiliary services. The outputted auxiliary services may be combined with the coded target output content.

DESCRIPTION OF THE DRAWINGS

The detailed description will refer to the following drawings in which like numerals refer to like elements, and in which.

DETAILED DESCRIPTION

Figure 1:
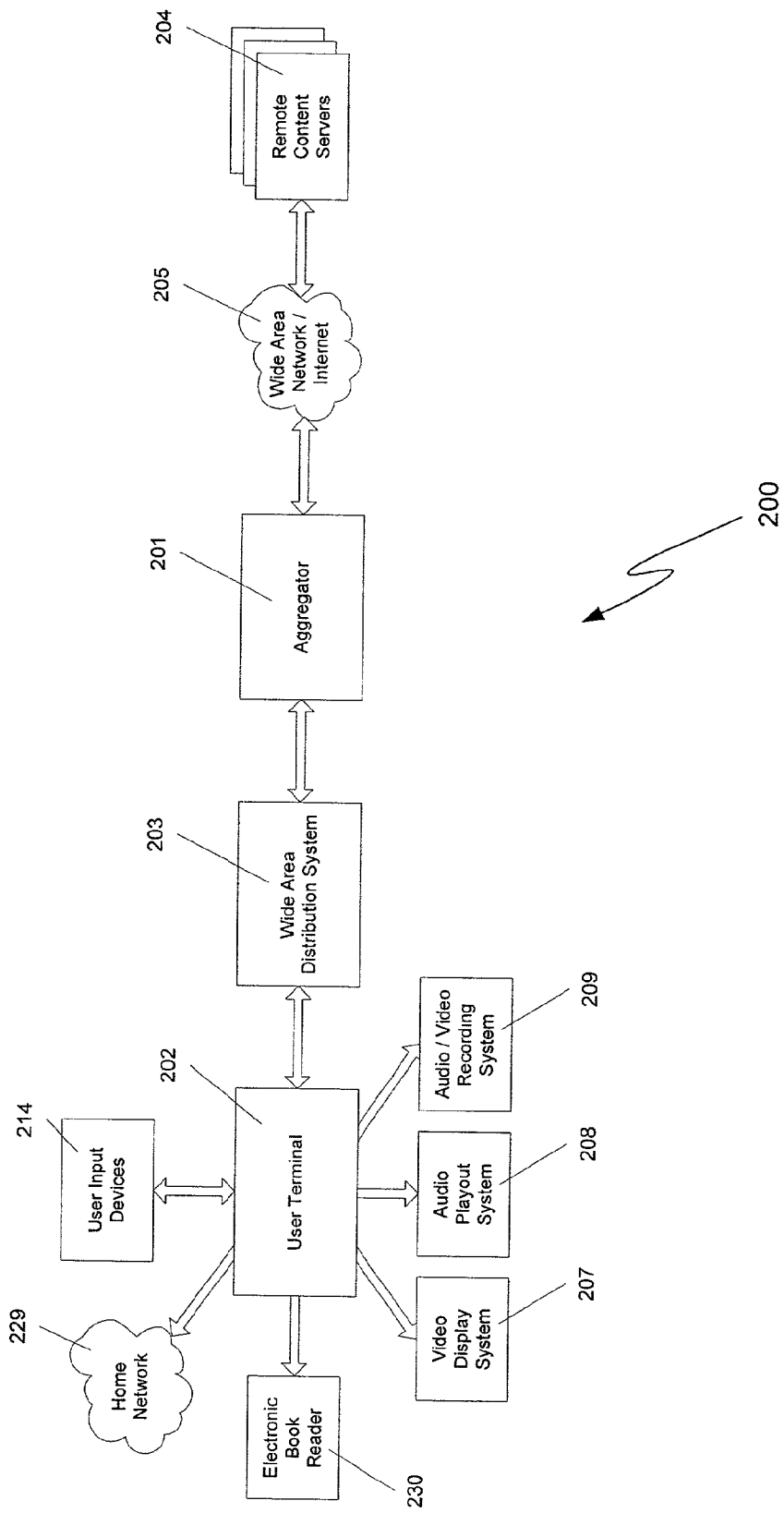
FIG. 1 is a block diagram of primary components of a content search, packaging, and delivery system.

FIG. 1 is a block diagram of a content search, packaging, and delivery system 200. The content to be packaged and delivered by the system 200 includes video, television, radio, audio, multimedia, computer software and electronic books. Components of the system 200 include an aggregator 201 and a user terminal 202, which are connected using a wide area distribution system 203. Other components are remote content servers 204 that exchange data with the aggregator 201 using a wide area network/Internet 205 connection. The user terminal 202 may incorporate a video display system 207, an audio playout system 208, an audio/video recording system 209, user input devices 214, an electronic book reader 230, and a connection to a home network 229 to interact with other devices in the user's home environment. Alternatively, one or more or all of the video display system 207, the audio playout system 208, the audio/video recording system 209, and the electronic book reader 230 may be separate components that are coupled to the user terminal 202.

Figure 4:
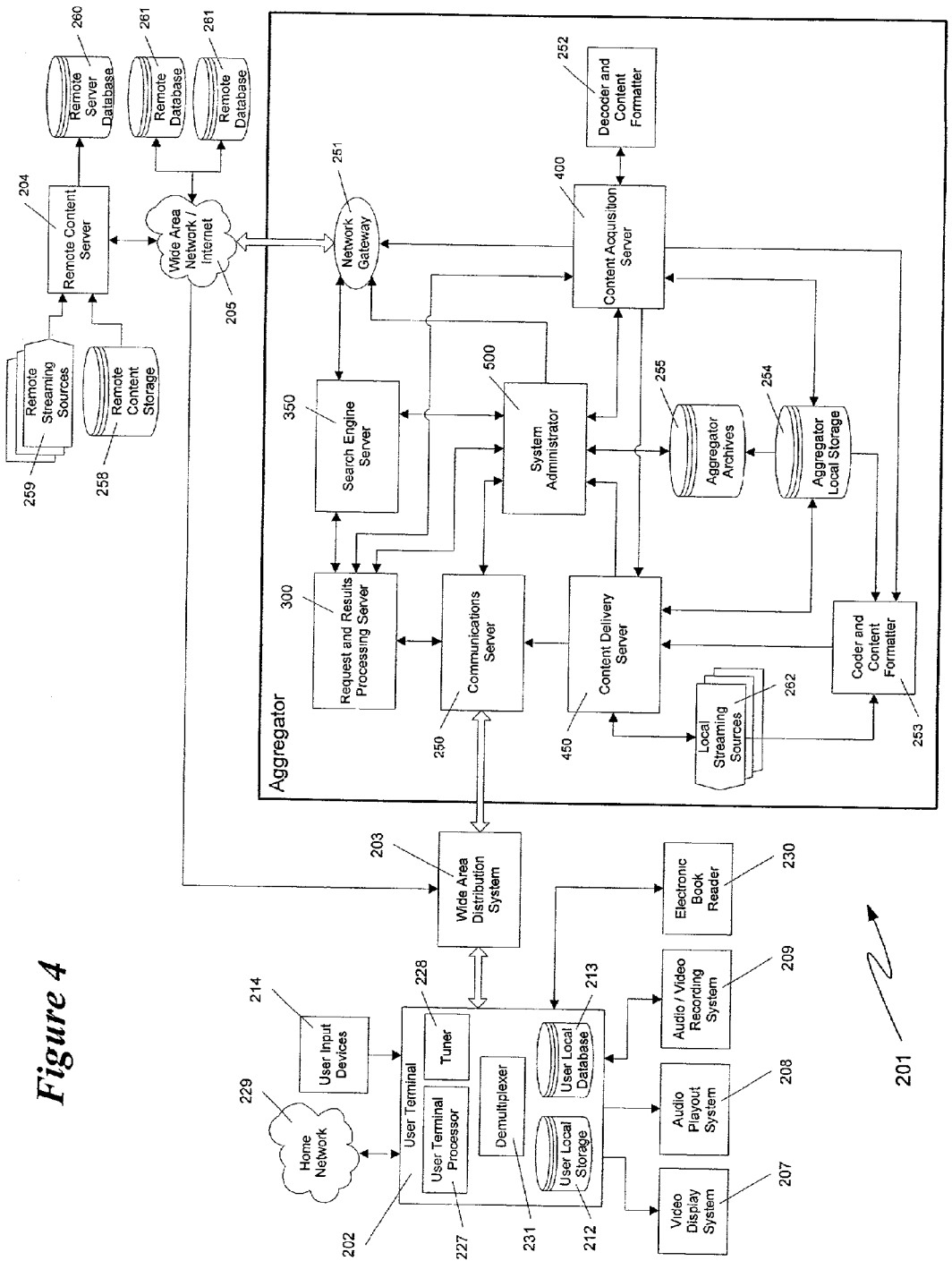
FIG. 4 is a schematic of the components of the content search, packaging, and delivery system showing subsystems of an aggregator, a user terminal, and a remote content server.

The system 200 allows a user to enter search parameters, such as keywords and category headings, and have the aggregator 201 use these parameters to locate, package, and deliver content to the user terminal 202 from numerous sources. The requests and content deliveries can be sent over communications links including, but not limited to, telephone lines, coaxial cable, fiber-optic cable, wireless connections, wide area networks, the Internet, and other communication media collectively represented by the wide area distribution system 203. The numerous sources of content are shown in FIG. 4 and include, but are not limited to, an aggregator local storage 254, local streaming sources 262, remote content storage 258, and remote streaming sources 259. In an embodiment, the local streaming sources 262 are comprised of the audio and video channels being delivered using a cable headend system that may house the aggregator 201.

The system 200 will take a user's search request and may perform a search of virtually every active and scheduled radio and television channel in the world, as well as archived sources of video and audio programming such as movies and recorded audio sources and sources of other multimedia, software, and electronic book content. In an embodiment, the system 200 will also search Internet Web sites and other online databases. The user will then be able to select programming or other content for download based on the search results. In an embodiment, the download, or delivery, process can be fulfilled by making the content available on a specific channel of a cable television system, or by transmitting the content using a digital communications protocol, such as the Internet standard TCP/IP, for example. In addition, the content search, packaging, and delivery system 200 is capable of formulating and presenting a list of suggested content based on an analysis of the user's current search parameters, stored information about previous searches and previously selected content downloads and other user-specific or related information. The system 200 is also capable of notifying a user prior to the start time of selected programming and availability of other content using such notification as an electronic mail message and/or an on-screen message indicating that the scheduled program will be broadcast at a specified time. The system 200 may support one or more digital rights management (DRM) systems to track the usage and copyrights rights associated with downloaded content and bill the user's account as appropriate and provide any license and usage fees to the content provider. The system 200 may implement a users' privacy protection scheme allowing users to control what information is gathered, limit what is done with that information, and review and delete the user's profile if desired.

Figure 2:
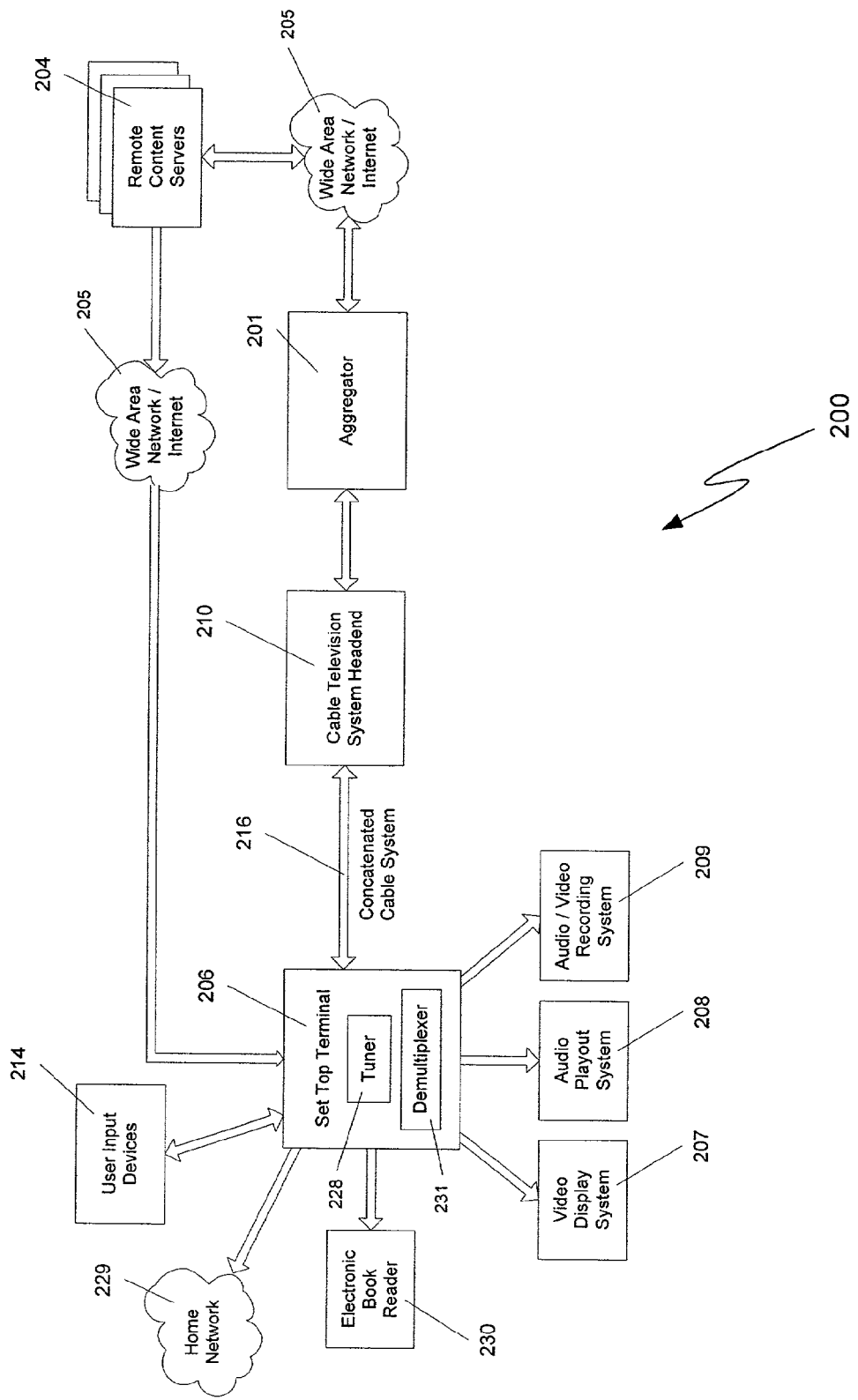
FIG. 2 is a block diagram of the components of the content search, packaging, and delivery system configured to deliver content to a set top terminal.

An overview of an embodiment of the system 200 is shown in FIG. 2 where the user terminal 202 is a set top terminal 206 that communicates with the aggregator 201 through a cable television system headend 210, thereby making use of the cable television system headend 210 high bandwidth concatenated cable system 216. Further, the set top terminal 206 system may include a tuner 228, a demultiplexer 231, the video display system 207, the audio playout system 208, the audio/video recording system 209, user input devices 214, an electronic book reader 230, and a connection to the user's home network 229. These components are used to tune, select, view, listen to, and store audio and video programming and other content delivered by the search, packaging, and delivery system 200. FIG. 2 also shows a communications path from one or more remote content servers 204 through the wide area network/Internet 205 directly to the set top terminal 206, which bypasses the aggregator 201 and cable television system headend 210. This path may be used in the case where the requested content is available in the required format from the remote content server 204 and is authorized for direct delivery to the user. In an alternative embodiment, the aggregator 201 is collocated with the cable television system headend 210 that is acting as the wide area distribution system 203 as is the case when a cable television system is also serving as the user's Internet service provider.

Figure 3:
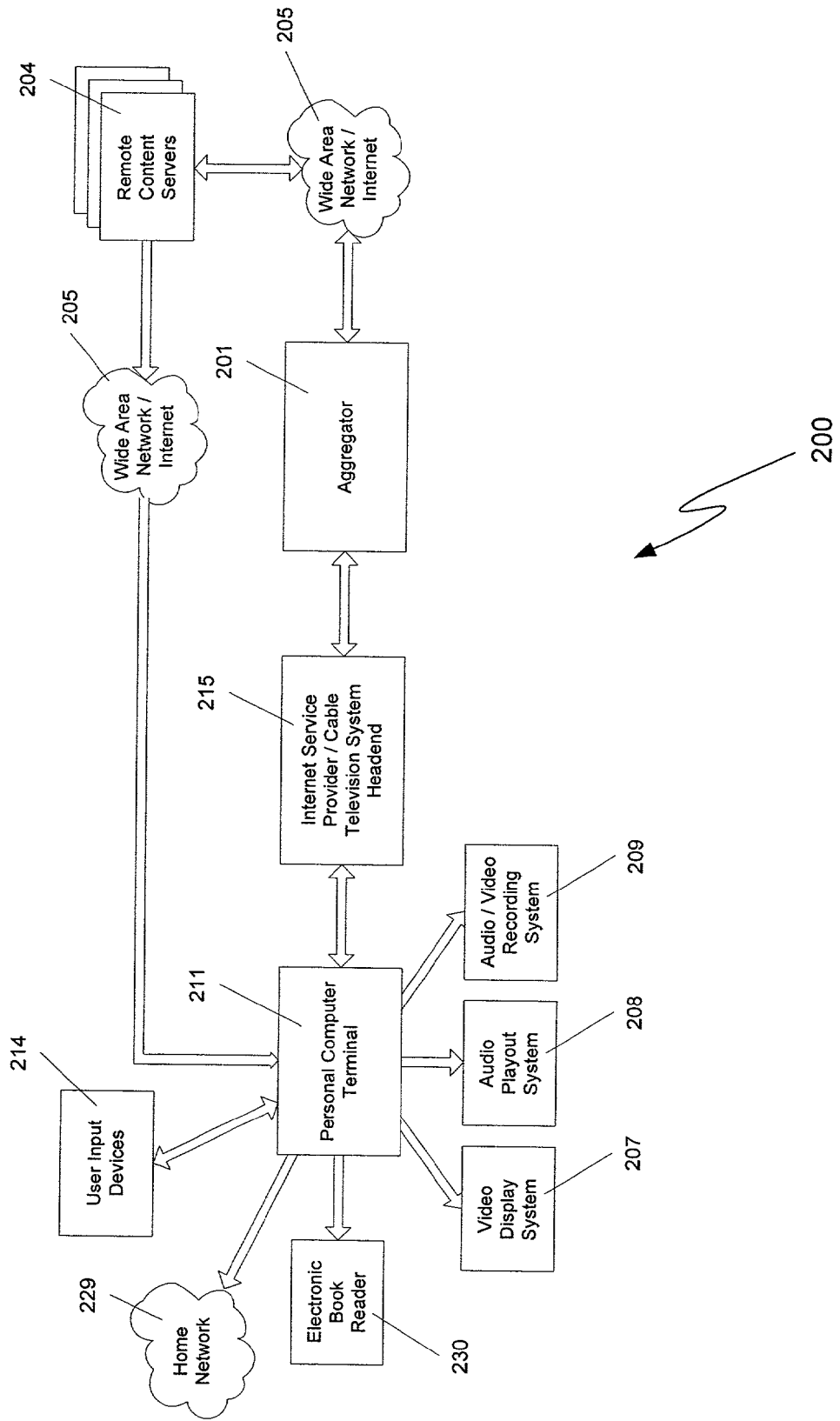
FIG. 3 is a block diagram of the components of the content search, packaging, and delivery system configured to deliver content to a personal computer terminal.

An overview of another embodiment of the system 200 is shown in FIG. 3, where the user terminal 202 is a personal computer terminal 211 that communicates with the aggregator 201 through an Internet service provider/cable television system headend 215. In this case, the content may be delivered by a cable headend that is operating as an Internet service provider (ISP). The personal computer terminal 211 also may include the video display system 207, the audio playout system 208, the audio/video recording system 209, user input devices 214, the electronic book reader 230, and the connection to the home network 229. A communications path also exists from one or more remote content servers 204 through the wide area network/Internet 205 directly to the personal computer terminal 211, which bypasses the aggregator 201 and the Internet service provider/cable television system headend 215 in the case where requested content is in the required format and is authorized for direct delivery to the user.

The user can receive video and audio programs (i.e., the content) in a number of different ways. First, the tuner 228 in the user terminal 202, shown in FIG. 2, can simply tune to the desired program, or the demultiplexer 231 can select a program from a digital multiplex, thereby displaying the program at the appropriate time. However, the desired program may not be broadcast by the user's cable television system headend 210, or the user would like to watch a program supplied by the local headend, but not subscribed to by the user, e.g., a boxing match broadcast by a premium channel that the user does not ordinarily receive. In these examples, the program can be delivered to the user by the aggregator 201 using the telephone lines, fiber-optic transmission lines, or other communication media, or using the cable television system headend 210. In an embodiment, the aggregator 201 can supply the desired program to the user by pulling programs from program delivery systems in the United States and abroad and delivering the program to system users. Therefore, a user can have access to programs outside the user's immediate viewing area.

FIG. 4 shows the system 200 and system components in more detail. At a user's location, the user terminal 202 includes the tuner 228, the demultiplexer 231, a user terminal processor 227, user local storage 212 and user local database 213. Coupled to the user terminal 202 may be user input devices 214, the video display system 207, the audio playout system 208, the audio/video recording system 209, an electronic book reader 230, and a connection to the home network 229.

The user terminal 202 is coupled through the wide area distribution system 203 to the aggregator 201 and further through the wide area network/Internet 205 to remote program sources. The remote program sources include remote streaming sources 259 and remote central storage 258. The remote program sources also include remote databases 261 and, through the remote content server 204, a remote server database 260.

The aggregator 201 may include a communications server 250 that communicates with the user terminal 202 through the wide area distribution system 203. The communications server 250 receives inputs from a request and results processing server 300, a content delivery server 450 and a system administrator 500. The content delivery server 450 receives inputs from a coder and content formatter 253 and a content acquisition server 400. The content delivery server 450 also accesses an aggregator local storage 254 and local streaming sources 262. Finally, the content delivery server 450 provides an output to the system administrator 500.

The coder and coder formatter 253 receives inputs from the content acquisition server 400, the aggregator local storage 254 and local streaming sources 262. The system administrator 500 receives inputs from the content and delivery server 450, and communicates with the content acquisition server 400, the request and results processing server 300, a search engine server 350 and aggregator archives 255. A decoder and content formatter 252 is coupled to the content acquisition server 400. Finally, a network gateway 251 couples components of the aggregator 201 with the remote content server 204 through the wide area network/Internet 205.

Programs received at the aggregator 201 may be input to the formatter 253. The formatter 253 reformats all input content into a format that is readily received by all user terminals 202 operably connected to the delivery system 200 (not shown in FIG. 4). In addition, the formatter 253 can store full or partial copies of content in compressed form in the aggregator local storage 254. Furthermore, the aggregator 201 can provide real-time delivery of certain content, such as a boxing match. In an embodiment, if a large number of users want a particular live program, then the cable television system headend 210 can broadcast the program on a particular channel available to all the requestors instead of broadcasting the program to each individual user over the wide area distribution system 203. See U.S. patent application Ser. No. 09/191,520, entitled Digital Broadcast Program Ordering, hereby incorporated by reference, for additional details of broadcast program delivery.

The aggregator 201 can also implement a screening process for limiting the number of programs captured to those programs with a viewing audience above a predetermined threshold. In effect, the aggregator 201 contains a filter that will pass only programs meeting the predetermined selection criteria. The filter may include programming that screens the content to reject specific items, such as adult content, for example.

The system administrator 500 records what fees should be paid and to whom. For example, the aggregator 201 will determine to whom any copyright or other fees should be paid when a program is broadcast.

The user terminal 202 may be a television, a set top terminal 206, a personal computer terminal 211 (not shown), or any device capable of receiving digital or analog data, or some combination thereof. The user terminal 202 is equipped with the user input devices 214 that communicate search criteria to the system 200 as well as navigate through the user terminal menu system and control the user terminal's other various functions. The user local storage 212 is used to store and archive content onto one or more removable and/or non-removable storage devices or media for later access. Removable storage media may include, but is not limited to, magnetic tape, magnetic disks, optical disks and modules, and electronic memory cartridges. The user local database 213 is the repository of all relevant information about a user's profile and account. This information includes, but is not limited to, user name, password, personal information that the user has authorized for storage, billing information, other users allowed access to the account, past search criteria, past content download information, and library information about stored content. As a consumer protection, the user terminal 202 may enable the account user to view the information stored in the user local database 213 and modify certain data fields and select which data fields may be reported to a main system database within the aggregator 201. Certain fields including, but not limited to, account numbers and billing info nation may not be allowed this level of user access.

The user terminal processor 227 may include a central processing unit and all associated hardware, software, and firmware modules to perform all operations within the user terminal 202. These operations include, but are not limited to, managing communications with the aggregator 201 and other networked devices, processing search and download requests, displaying search and download results, managing and controlling communications with the user local storage 212 and the user local database 213, responding to user interaction with presentation of graphical user interface (GUI) menus, playing out selected programming content using various audio and video output devices, implementing the user's part of the digital rights management schema, and administering the user's account and billing. The tuner 228 and the demultiplexer 231 are used to select an audio/video channel for playout from the channels available on the cable television system 216.

In an embodiment, the user terminal 202 may incorporate selected features of the aggregator 201. For example, the user terminal 202 may include a small metadata crawler, an aggregator, and program content and program metadata storage.

The user terminal 202 communicates with the aggregator 201 using the wide area distribution system 203. Within the aggregator 201, the communications server 250 acts as the interface point to the wide area distribution system 203 for the purpose of managing primary communications to system users. The communications server 250 routes incoming user requests and associated user information to the request and results processing server 300, routes search results and content downloads through the wide area distribution system 203 to end users, and may route billing information from a customer billing server to the end users. The request and results processing server 300 performs the basic processing and routing related to user search requests, content download requests, administrative information requests, search results, related content suggestions, and programming notification.

Figure 5:
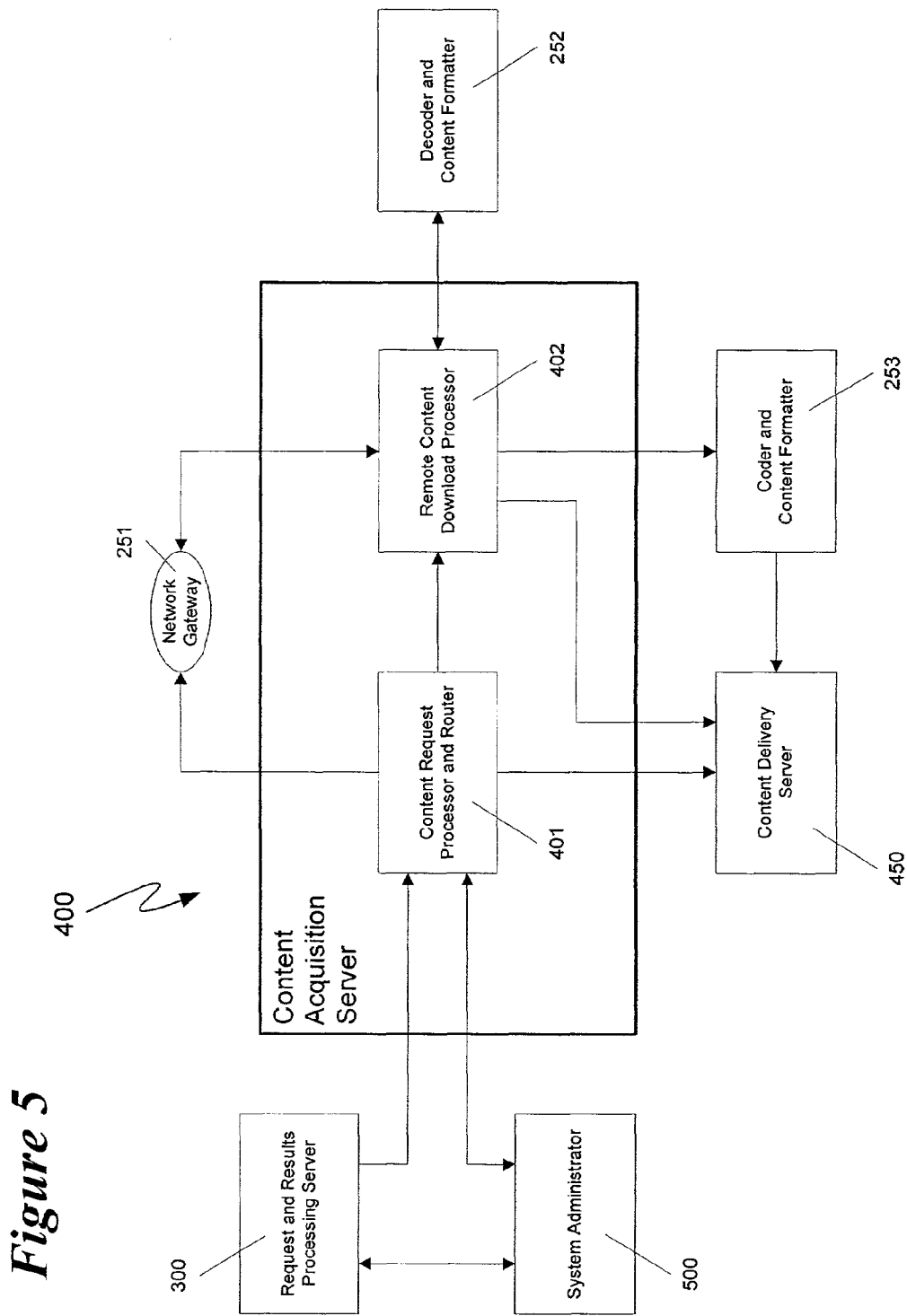
FIG. 5 is a schematic of subsystems of a content acquisition server and components with which the content acquisition server interacts as part of a content search, packaging, and delivery system.

The content acquisition server 400, as shown in detail in FIG. 5 receives content download requests from the request and results processing server 300. The content acquisition server 400 includes a content request processor and router 401 and a remote content download processor 402. A download request is made by the user for content selections from sources including, but not limited to, earlier programming searches, recurring scheduled events, an electronic program guide, lists of electronic books and computer software, advertisements, promotions, and affiliated Internet websites. In general, a download request will be accompanied by data indicating the source of the content and whether the content is local or remote. Requests for content that is available only from a remote site may be routed to the network gateway 251 and then to the appropriate remote source. Remote sources include, but are not limited to, the remote content storage 258 and the remote streaming sources 259 shown in FIG. 4. The remote content server 204 verifies the request and returns the content through the wide area network/Internet 205. If the programming content is in the appropriate format and is authorized for direct delivery to the user, the content may be routed through the wide area network/Internet 205 and the wide area distribution system 203 directly to the user terminal 202. During this transfer, administrative data pertaining to billing and verification of delivery may be sent back to the aggregator 201.

Figure 6:
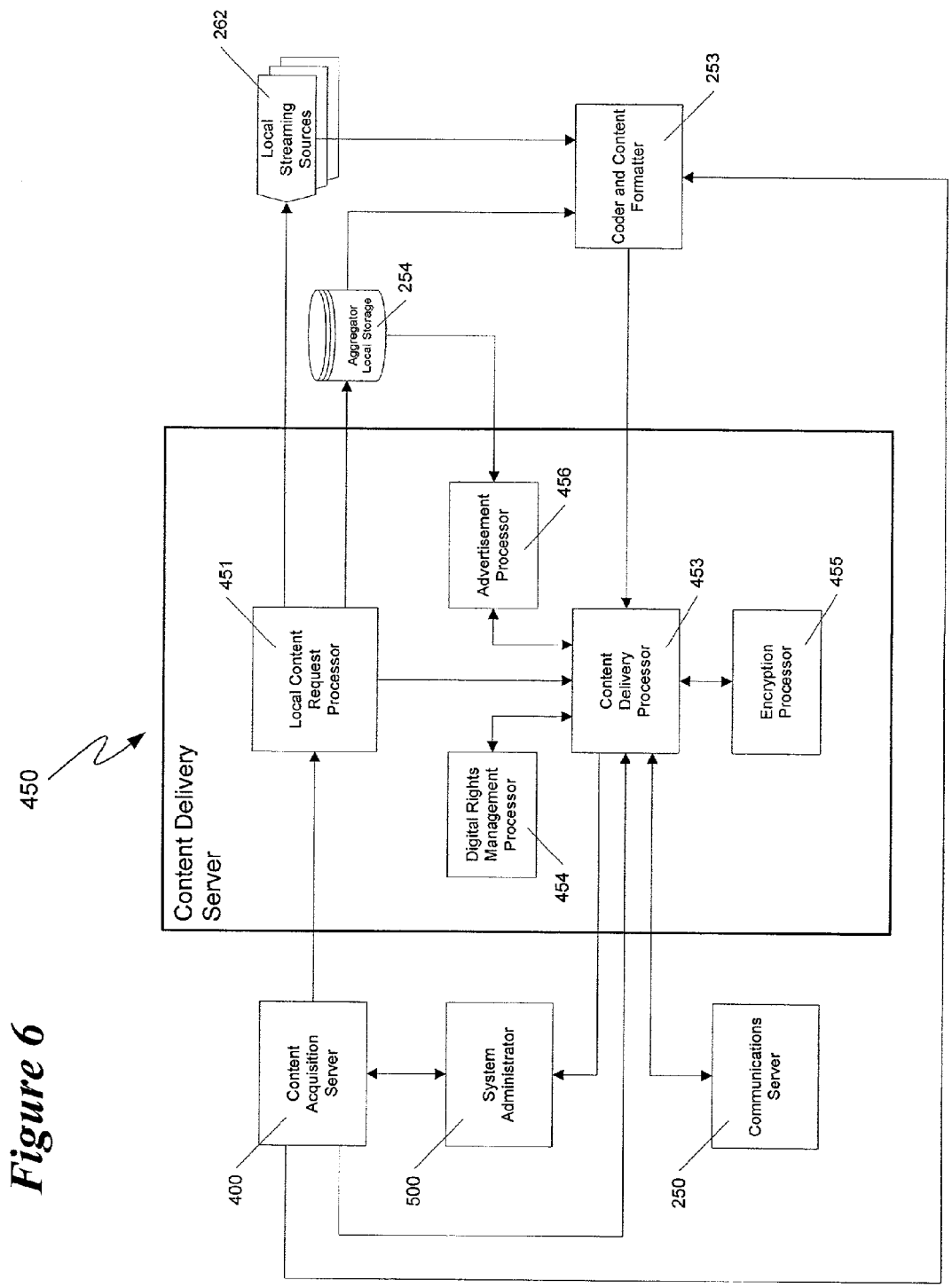
FIG. 6 is a schematic of subsystems of a content delivery server and components with which the content delivery server interacts as part of the content search, packaging, and delivery system.

Programming that is not formatted and authorized for direct delivery from a remote source may be transmitted through the network gateway 251 to the remote content download processor 402 contained within the content acquisition server 400. The remote content download processor 402 buffers or caches the programming content while managing the download connection to the remote source. The programming content is then routed to the decoder and content formatter 252, which may be capable of decoding various industry formats and compression schemes and may reformat and encode the decoded data and associated metadata into one or more preferred content formats for delivery and for local storage. The processed programming content, along with user identification and routing data, is then routed to the content delivery server 450, which then manages the delivery of the content through the communications server 250 and wide area distribution system 203 to the user terminal 202. The content delivery server 450 is shown in detail in FIG. 6. The content acquisition server 400 is described in more detail in co-pending patent application entitled "Video and Digital Multimedia Aggregator," filed on Aug. 3, 2001, which is incorporated by reference.

Requests for programming available from a local source are routed directly to a local content request processor 451 within the content delivery server 450. The local content request processor 451 initiates delivery of content from local sources including, but not limited to, the aggregator local storage 254 and aggregator local streaming sources 262, and routes the content to the coder and file formatter 253. In an embodiment, the local streaming sources 262 can include any of the cable television channels available at the cable television system headend 210 housing the aggregator 201. If the programming content is not already in the user-requested format and coding scheme, the coder and content formatter 253 (see FIG. 4) performs content formatting and coding of the programming for delivery to the user. The content is then forwarded to a content delivery processor 453, which manages the delivery of the content through the communications server 250 and wide area distribution system 203 to the user terminal 202.

If the programming being delivered from a remote content server 204 will be stored to the aggregator local storage 254, the programming metadata is analyzed to determine if the content is in an acceptable format for local storage. The aggregator 201 may be configured to store content in one or more specific formats that will balance the highest quality of programming content to be delivered to the users versus available storage space. In an embodiment, one or more of the selected storage formats will make the most efficient use of the aggregator local storage 254 resources as well as support high-speed delivery to system users. If the content acquisition server 400 determines that the content does not meet the format requirements for local storage, the content stream and/or contents are routed to the decoder and content formatter 252 (see FIG. 4). The decoder and content formatter 252 decodes the incoming data and may extract digital and/or analog data representing the content and any metadata associated with the content. The decoder and content formatter 252 then reformats the content into the required formats and coding schemes for local storage. The properly formatted programming content may then be stored to the aggregator local storage 254.

Returning to FIG. 5, the remote content download processor 402 analyzes the programming content's metadata and determines if the content is in the appropriate format and coding scheme for delivery to the user. The format and coding scheme for delivery may be different from that used for local storage in order to accommodate particular parameters of a user's download request. The user may request specific formats and coding schemes due to considerations including, but not limited to, the method of playback, the type of programming, whether the user intends to store the content, or the type and bandwidth of the connection the user terminal 202 has to the aggregator 201 or the remote content server 204. If the content does not meet the format criteria, the content stream and/or contents are routed to the decoder and content formatter 252 along with the required formatting and coding parameters. The decoder and content formatter 252 decodes the incoming data and may extract digital and/or analog data representing the content and its metadata. The decoder and content formatter 252 then reformats the content into the required formats and coding schemes for delivery to the user.

If the programming download request is to be fulfilled by the local aggregator 201, the local content request processor 451 of the content delivery server 450 (see FIG. 6) analyzes the programming content's metadata and determines if the content is in the appropriate format and coding scheme for delivery to the user. If the format and coding scheme is not correct, the local content request processor 451 retrieves the programming content from the aggregator local storage 254 or the appropriate local streaming sources 262 and routes the programming to the coder and content formatter 253 along with the required formatting and coding parameters. The coder and content formatter 253 then decodes the incoming data and may extract digital and/or analog data representing the content and its metadata. The coder and content formatter 253 then reformats the content into the required formats and coding schemes for delivery to the user. The correctly coded and formatted programming content file(s) and/or streams, whether directly from local sources or from the coder and content formatter 253, and routes this content to the content delivery server 450.

The coder and content formatter 253 may employ digital compression techniques to increase existing transmission capacity. A number of digital compression algorithms currently exist or may be developed in the future that can achieve the resultant increase in capacity and improved signal quality desired for the system 200. For television and video content, algorithms generally use one or more of three basic digital compression techniques: (1) within-frame (intraframe) compression, (2) frame-to-frame (interframe) compression, and (3) within carrier compression or a combination of two or more techniques. The coder and content formatter 253 of the content search, packaging, and delivery system 200 will be able to use any one or combination of two or more of these techniques in addition to being able to have its capabilities modularly expanded to include any emerging and future techniques that are determined to be desirable. In an embodiment, although a single digital compression standard may be used for the delivery system 200, different levels of compression and/or digital coding can be utilized when delivering programs to a user requesting a particular program. For example, if the program is sent out using an HDTV format, then less compression is used as opposed to sending out the program using a standard video format. The reason is that the HDTV format requires more digital data per portion of content. Since the HDTV format requires more digital data, the HDTV format will also require more bandwidth to transmit, possibly increasing the cost of delivery. Therefore, the quality of the video delivered may be a variable in the fees charged to users of the system 200.

The decoder and content formatter 252 and the coder and content formatter 253 may be similar or identical in functionality, software configuration, and/or hardware configuration. In an embodiment, the decoder and content formatter 252 and the coder and content formatter 253 may be embodied by a single subsystem represented by a codec and content formatter 270, which is shown in detail in FIG. 7. In an alternate embodiment, the decoder and content formatter 252 and the coder and content formatter 253 may each comprise one or more separate codec and content formatters 270. The codec and content formatter 270 includes a codec and content formatter processor 271 that may communicate with and control other components of the codec and content formatter 270. In particular, the formatter processor 271 communicates with one or more content routers 272, one or more formatting codecs 274, and one or more auxiliary services processors 276. The formatter processor 271 communicates with one or more content routers 272 in order to transmit routing connection parameters and paths for the transfer of content data between various source and target subsystems. The formatter processor 271 communicates with one or more formatting codecs 274 to identify and manage available codec processing resources, configure codec hardware and/or software parameters for decoding, formatting, and coding operations, and to transmit routing information and coding and formatting parameters necessary for the formatting codecs 274 to decode, format, and code content from various sources. The formatter processor 271 also communicates with one or more auxiliary services processors 276 to allocate resources and transmit parameters associated with requests for auxiliary services processing. Auxiliary services may include closed captioning, descriptive video services, advertising, interactive services, and other data services. The formatter processor 271 may also communicate with other components of the content search, packaging, and delivery system 200 including the content delivery server 450, the content acquisition server 400, the aggregator local storage 254, and the local streaming sources 262 (see FIG. 4). Communications with these other systems includes receiving coding and formatting requests, transmitting content routing data, and managing content flow between various content sources and one or more components of the codec and content formatter 270.

When the remote content download processor 402 within the content acquisition server 400 and/or the content delivery processor 453 within the content delivery server 450 determine that a particular content entity needs to be decoded, formatted, reformatted, and/or coded, the respective processors (402, 453) transmit a coding and formatting request to the codec and content formatter 270. Coding and formatting requests convey data to the codec and content formatter 270 characterizing the input source content and the desired output target content. Data conveyed about the source and target content may include parameters such as physical and/or logical addresses, coding and compression parameters, format descriptions, content sizes and/or lengths, description or location of auxiliary services combined with the source content, description or location of auxiliary services to be combined with the target content, and other metadata elements that may be required for coding, formatting, and routing. The codec and content formatter 270 may then use these parameters to identify available resources, establish content routing paths, configure formatting codecs 274, configure auxiliary services processors 276, and perform the required coding and formatting operations to fulfill the coding and formatting request. In an embodiment, a coding and formatting request may identify one or more target content coding and formatting schemes, as in the case where one type of formatting may be applied to the target content for storage and another type of formatting may be applied to the target content for delivery to system users, which may require the codec and content formatter 270 to configure and control one or more of the formatting codecs 274 and auxiliary services processors 276.

Figure 7:
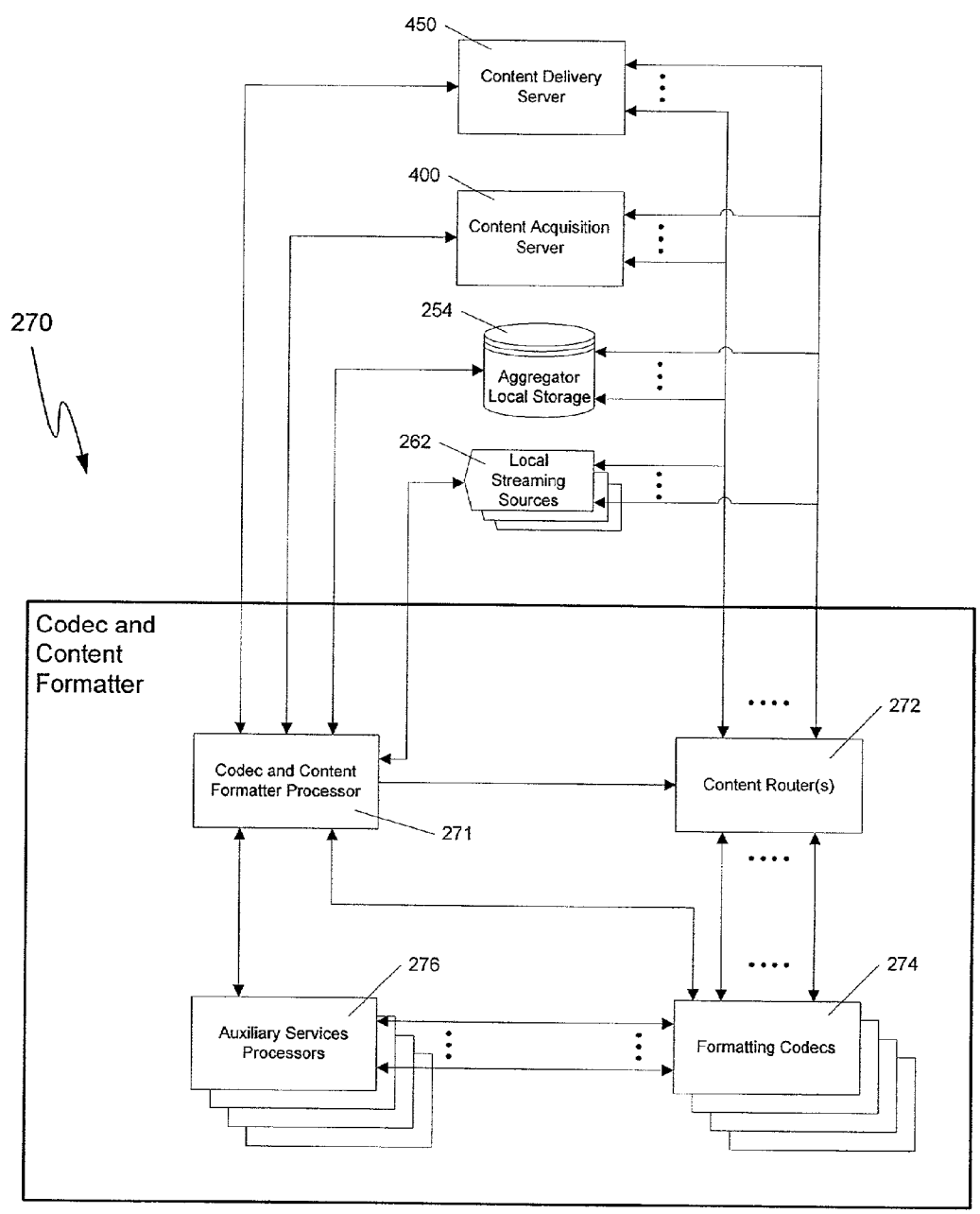
FIG. 7 is a schematic of subsystems of a codec and content formatter and components with which the codec and content formatter interacts as part of the content search, packaging, and delivery system.

The codec and content formatter 270 may use one or more of the content routers 272 to dynamically establish logical and/or physical circuit connections for transmission of content data between the various subsystems shown in FIG. 7. A content router 272 may comprise one or more hardware systems and one or more software modules that may operate under the direction of the formatter processor 271 to establish and manage the interconnections between subsystems required to transfer content in support of one or more coding and formatting operations. In FIG. 7, several of the interconnections between subsystems are shown as two connection lines and a series of dots between the two lines. This convention is used to indicate that at any time there may exist one or more connections or circuits between one or more of the connected subsystems and that between two connected subsystems the number of connections may vary. Each collection of connections or circuits may comprise one or more logical and/or one or more physical connections between software and/or hardware modules. Physical routing configurations, such as may be required for the transfer of analog content, may be achieved using one or more industry standard and/or custom components such as circuit switching devices, matrix switches, distribution amplifiers, signal splitters, input and output ports, and patch bays. Logical routing, such as may be required for the transfer of digital content, may be achieved using one or more digital packet transport protocols that may operate on one or more local area networks supported by the system administrator 500 as part of the content search, packaging, and delivery system 200. In an embodiment, the functionality of the content routers 272 may be implemented by one or more subsystems and may be functionally and/or physically external to the codec and content formatter 270 and may be a subsystem (not shown in FIG. 4) of the aggregator 201. In another embodiment, the functionality of the content routers 272 may be implemented by one or more subsystems and may be functionally and/or physically external to the aggregator 201 so that the aggregator 201 and its subsystems may connect to the content routers 272, or equivalent systems, through external interfaces (not shown in FIG. 4). The number of connections and the logical and physical routing paths of such connections both within the codec and file formatter 270 and external to the codec and file formatter 270 may be changed as required to accommodate a smaller or larger number of content pathways and to accommodate various source and destination combinations required at any given time. These pathways may be created or modified on a demand basis by the formatter processor 271 and may be modified prior to a coding and formatting operation and/or during a coding and formatting operation as may be required.

Content that is stored locally by the system 200 and/or acquired remotely may exist in one or more of numerous standardized and/or proprietary formats with various coding and compression schemes applied and may need to be decoded, reformatted, and/or recoded to satisfy local storage requirements and requirements of delivery to one or more system users. The content decoding, formatting, and/or coding functions may be performed by one or more of the formatting codecs 274 as shown in FIG. 7. Decoding of a content file or stream may comprise several processing operations that may include performing a packet or frame alignment, reading and caching content metadata, reading embedded time code information, reading and caching auxiliary services data, and recovering and caching content payload data in digital form and/or analog baseband form. Formatting or reformatting of content payload data may comprise several processing operations that may include analog-to-digital conversion, digital-to-analog conversion, packetizing or framing digital data representing content into one or more standard and/or proprietary formats, translating digital data representing content from one or more standard and/or proprietary formats into one or more other standard and/or proprietary formats, modifications to existing auxiliary services that may be packaged with the content, addition of auxiliary services such as closed captioning and/or advertising, frame rate translation of video content, video aspect ratio format conversion (e.g., 4×3 television or 16×9 movies), and any required audio and/or video processing. Coding of a content file or stream may comprise several processing operations that may include applying varying levels of compression and various schemes of error correction coding to one or more content files and/or signals.

The codec and content formatter 270 may contain one or more banks of one or more formatting codecs 274 that may comprise one or more separate software and/or hardware modules. The hardware and/or software modules may exist as a flexible group of resources that may be accessed on a demand basis and may be dynamically assigned and configured to accommodate virtually any content decoding, formatting, and coding operation. When the formatter processor 271 receives a coding and formatting task request from the content acquisition server 400 or the content delivery server 450, the formatter processor 271 may poll the group of formatting codec 274 resources, identify available resources required for the requested task, configure those resources to perform the requested task thereby configuring a formatting codec 274, and transmit the required decoding, formatting, and coding parameters as well as routing information to the newly configured formatting codec 274. In an embodiment, the formatter processor 271 may configure and activate one or more available hardware and/or software modules by downloading appropriate software modules to perform particular decoding, formatting, and coding tasks as required by a user content download request or other content acquisition task. The ability of the formatting codecs 274 to be software configurable may allow a high degree of configuration flexibility as well as the ability to accommodate coding and formatting schemes yet to be developed.

Figure 8:
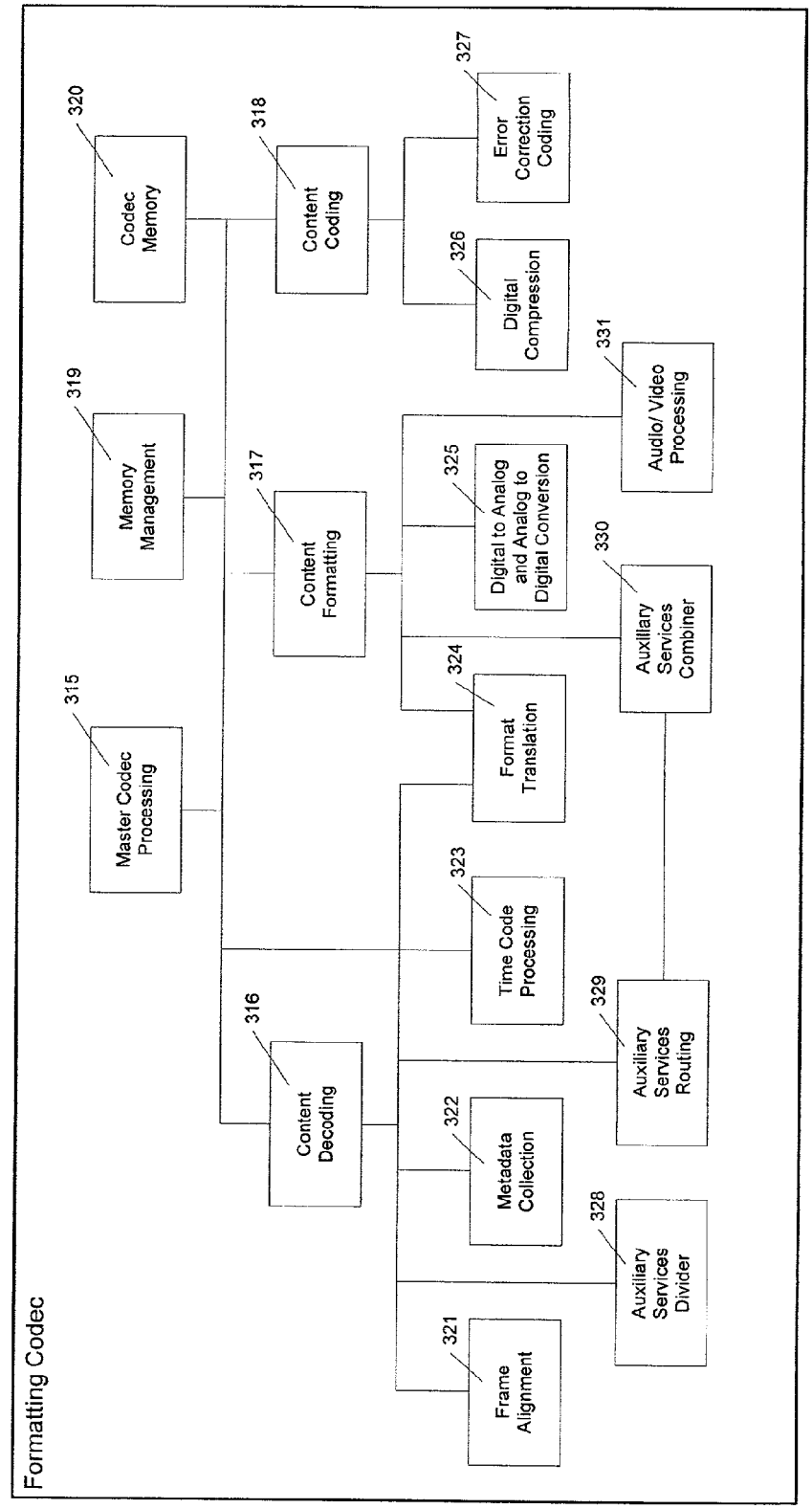
FIG. 8 is a diagram of components of a formatting codec used with the codec and content formatter of FIG. 7.

An example of a formatting codec 274 configuration is shown in detail in FIG. 8. The formatting codec 274 includes a master codec processing module 315 that is coupled to one or more other processing modules and that may manage the configuration and operation of one or more other processing modules within the formatting codec 274. In an embodiment, the processing modules within the formatting codec 274 may be interconnected using a bus topology that may allow dynamic interconnectivity between up to all of the processing modules and may support logical addressing of modules for communications routing. The master codec processing module 315 may be coupled to a memory management module 319 and a codec memory module 320. The memory management module 319 may dynamically assign and manage resources within the codec memory 320 for use by one or more other processing modules within the formatting codec 274.

The master codec processing module 315 is coupled to a content decoding module 316 that may manage the configuration and operation of one or more processing modules in order to perform content decoding operations. Coupled to the content decoding module 316 is a frame alignment module 321 that may use decoding parameters received from the formatter processor 271 to synchronize and align the formatting codec 274 with the incoming content data packets and/or frames. Also coupled to the content decoding module 316 is a metadata collection module 322 that may read any metadata information contained in one or more content files and content transport streams and may temporarily store this data in the codec memory 320. A time code processing module 323 is also coupled to the content decoding module 316 and may extract any time code data that may be embedded in one or more content files and/or content transport streams and may store and/or process the time code as required to support coding and formatting operations. The content decoding module 316 is further coupled to a format translation module 324, which may perform the actual translation of the incoming source content data to the desired output target content format. An example of format translation may involve reading a source video file in a proprietary digital format and translating the content data into a standardized format. The content decoding module 316 is also coupled to an auxiliary services divider module 328 and an auxiliary services routing module 329. The auxiliary services divider module 328 may read any auxiliary services that may be a part of the source content files and/or transport stream and may separate, or parse, these data services from the content data and metadata. The auxiliary services routing module 329 may then route the auxiliary services data to one or more of the codec memory 320 and/or auxiliary services processors 276.

The master codec processing module 315 is coupled to a content formatting module 317 that may perform content formatting operations and/or manage the configuration and operation of one or more processing modules in order to perform content formatting operations. Coupled to the content formatting module 317 is a format translation module 324 that may perform translation of incoming source content data into desired output target content format. Processing steps to accomplish content formatting and format translation may be optimized to minimize degradation of the content data and/or signal. The content formatting module 317 is also coupled to a digital-to-analog and analog-to-digital conversion module 325 that may perform any required conversion of audio and video content between analog and digital formats to support source content that may exist in various digital and/or analog formats and may be delivered to system users in various digital and/or analog formats. The content formatting module 317 is also coupled to an auxiliary services combiner module 330, which may combine and/or recombine any previously existing and/or newly established auxiliary services with the target content files and/or transport stream. The auxiliary services combiner 330 is in turn coupled to the auxiliary services routing module 329 in order to receive appropriate auxiliary services data. The content formatting module 317 is further coupled to an audio/video processing module 331 that may perform various processing functions on the audio and video signals of the source content to meet target content requirements. The audio/video processing functions may include adjusting audio levels, combining and/or splitting audio signals, and adjusting video luminance and chrominance.

The master codec processing module 315 may also be coupled to a content coding module 318 that may perform content coding operations and/or manage the configuration and operation of one or more processing modules in order to perform content coding operations. Coupled to the content coding module 318 is a digital compression module 326 that, as required, may apply various digital compression schemes to the target content that was not previously digitally compressed during content formatting and or translation. Different levels of digital compression may be applied to one or more target content files and/or transport streams. The different compression levels may be based on requirements such as those regarding content delivery quality and available content delivery bandwidth and/or storage capacities. An error correction coding module 327 is also coupled to the content coding module 318 and may apply one or more of various digital forward error correction coding schemes to one or more of the target content files and/or transport streams to reduce digital errors during content delivery and allow correction of data containing a certain level of errors.

The codec and content formatter 270 may contain one or more banks of auxiliary services processors 276. The auxiliary services processors may comprise one or more separate software and/or hardware modules. The auxiliary services processors 276 may process and/or generate auxiliary services to be included with target content. Such auxiliary services may include closed captioning services, descriptive video services, advertising, interactive services, and other data services. The hardware and/or software modules may exist as a flexible group of resources that may be accessed on a demand basis and that may be dynamically assigned and configured to accommodate various auxiliary services processing operations. When the codec and content formatter processor 271 receives a coding and formatting request that includes auxiliary services processing requests from the content acquisition server 400 or the content delivery server 450, the formatter processor 271 may analyze the auxiliary processing parameters contained in the coding and formatting request. The analyzed parameters are then used to determine the required configuration of one or more auxiliary services processors 276 necessary to perform the requested operations. The formatter processor 271 may then poll the group of auxiliary services processing resources, identify the available resources required for the requested task, configure those resources to perform the requested task, and transmit the required auxiliary services parameters as well as routing information to the auxiliary services processor 276. In an embodiment, the formatter processor 271 may configure and activate one or more available hardware and/or software modules by downloading appropriate software modules to perform particular auxiliary services processing tasks as required by a user content download request or other content acquisition task. The ability of the formatting codecs 274 to be software configurable allows a high degree of configuration flexibility as well as the ability to accommodate auxiliary services yet to be developed.

Auxiliary services may accompany both analog and digital content deliveries and may be embedded in one or more content files and/or transport streams. Auxiliary services accompanying video programming content may include closed captioning services for users with hearing impairments, descriptive video services for system users with visual impairments, alternative language audio service, v-chip program rating information, critical review information, device control parameters and commands, future programming schedules, advertising, advertising insert tags, other text and data services, and interactive services data such as browser pages, menus, icons, and links. Auxiliary services accompanying audio programming content may include extended metadata such as graphics files, in-depth data about the producers of the content, critical reviews, future programming schedules, device control parameters and commands, advertising, advertising insert tags, other text and data services, and interactive services data such as browser pages, menus, icons, and links. Auxiliary services processed by the formatter 270 may be pre-existing services recovered from source content and routed from one or more formatting codecs 274 to one or more auxiliary services processors 276 and/or newly established services transferred from one or more other content search, packaging, and delivery system 200 resources through the codec and content formatter processor 271 to one or more auxiliary services processors 276. In an embodiment, one or more auxiliary services processors 276 may comprise an audio closed captioning processor that may receive audio and time code data for a particular video content entity from a formatting codec 274, perform speech-recognition and other processing on the audio data, and output one or more files and/or transport streams that contain time-code-synchronized closed captioning text and data to be combined with the target content as an auxiliary service.

Figure 9:
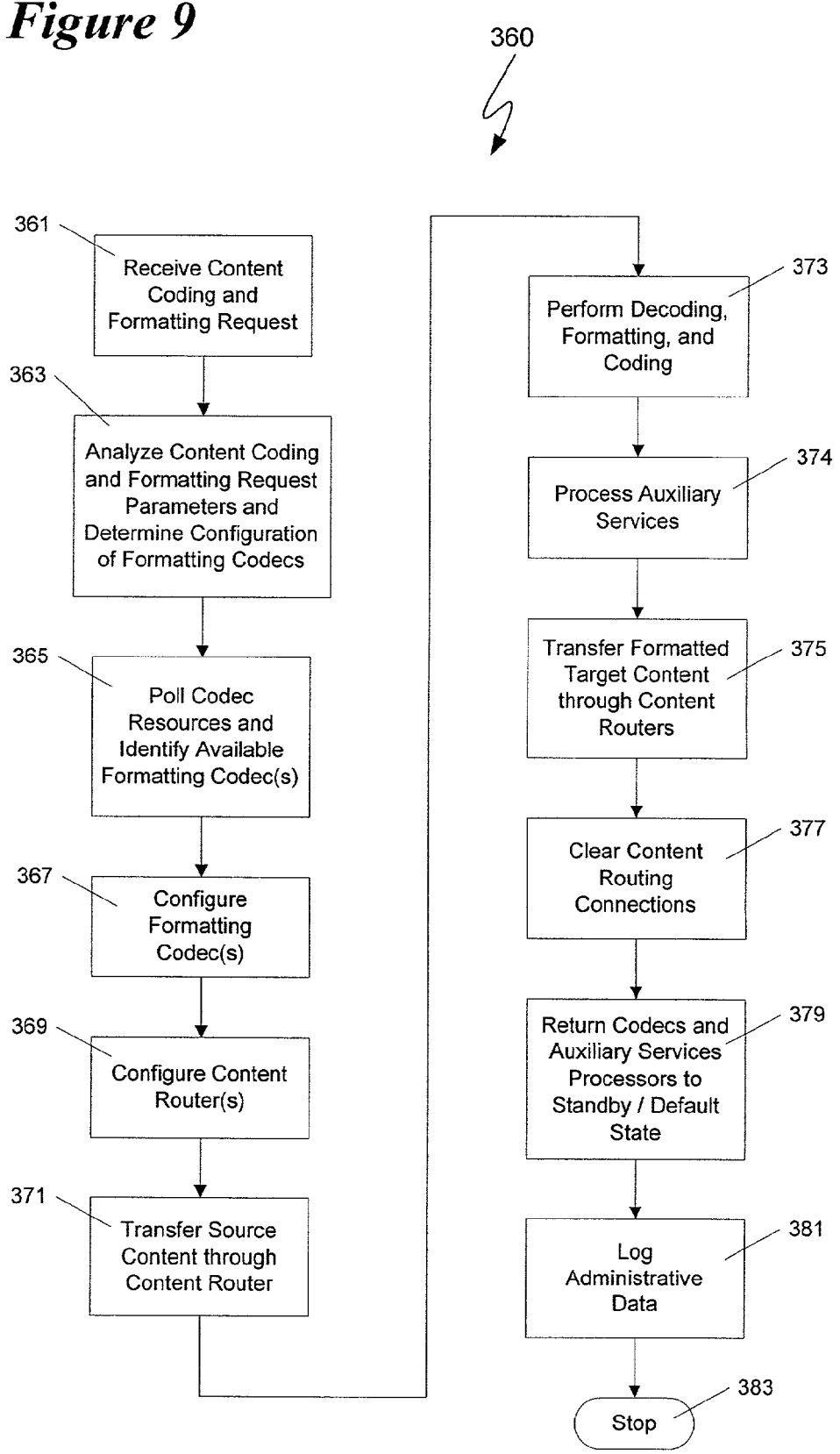
FIG. 9 shows a flowchart describing a process of decoding, formatting, and coding source content and outputting target content.

FIG. 9 shows an overview of the content formatting and coding process 360 performed by the codec and content formatter 270. The codec and content formatter processor 271 (see FIG. 8) first receives a coding and formatting request from the content acquisition server 400 and/or the content delivery server 450, routine 361. The formatter processor 271 then uses routine 363 to analyze the coding and formatting request parameters contained in the coding and formatting request in order to determine the required configuration of one or more formatting codecs 274 necessary to perform the requested operations. The formatter processor 271 may then poll formatting and coding resources, routine 365, and identify available formatting codec hardware and/or software modules necessary to realize the required configuration. Routine 367 may then configure one or more formatting codecs 274 using the coding and formatting request parameters and required configuration data to access and configure one or more formatting codec 274 hardware and/or software modules. The formatter processor 271 may then use source content and target content routing address information from a decoding and formatting request to configure one or more content routers 272, routine 369. Routine 371 may then initiate and manage the transfer of source content through one or more content routers 272 from one or more source locations to one or more formatting codecs 274. Source locations may include the content acquisition server 400, the content delivery server 450, aggregator local storage 254, and local streaming sources 262. One or more formatting codecs 274 may then execute routine 373, which may make use of the hardware and/or software modules shown in detail in FIG. 8 to perform the requested decoding, formatting, and coding operations to produce the target output content. Routine 374 may then perform processing of auxiliary services as outlined in the content coding and formatting request. Auxiliary services processing starts at the formatting codec 274, which parses existing auxiliary services from the source content and routes those services to one or more auxiliary services processors 276, which perform appropriate processing on existing auxiliary services as well as establish new auxiliary services as required. The auxiliary services processors 276 may then route the appropriate auxiliary services to one or more formatting codecs 274 for combination with one or more target output content files and/or data transport streams.

Once the one or more target content files and/or transports streams have been assembled, routine 375 within the formatter processor 271 transfers the formatted target content through one or more content routers 272 to one or more target addresses residing in one or more components external to the codec and content formatter 270 which may include the content acquisition server 400, the content delivery server 450, aggregator local storage 254, and/or local streaming sources 262. The formatter processor 271 may then clear content routing connections using routine 377. Content routing connections to be cleared may include one or more physical routing connections and/or one or more logical routing connections. Physical routing connections may be cleared by returning routing circuitry to an idle or standby state and logical routing connections may be cleared by removing logical address information from appropriate memory registers within one or more content routers 272. The formatter processor 271 may then return one or more configured formatting codecs 274 and/or auxiliary services processors 276 to a standby and/or default state, routine 379, and return the one or more formatting codec 274 and or auxiliary services processor 276 hardware and/or software modules to the available pools of formatting resources and/or auxiliary services processing resources, respectively. Routine 381 within the formatter processor 271 may then log appropriate administrative data with the content acquisition server 400 and/or the content delivery server 450. Routine 383 may then stop processing.

Figure 10:
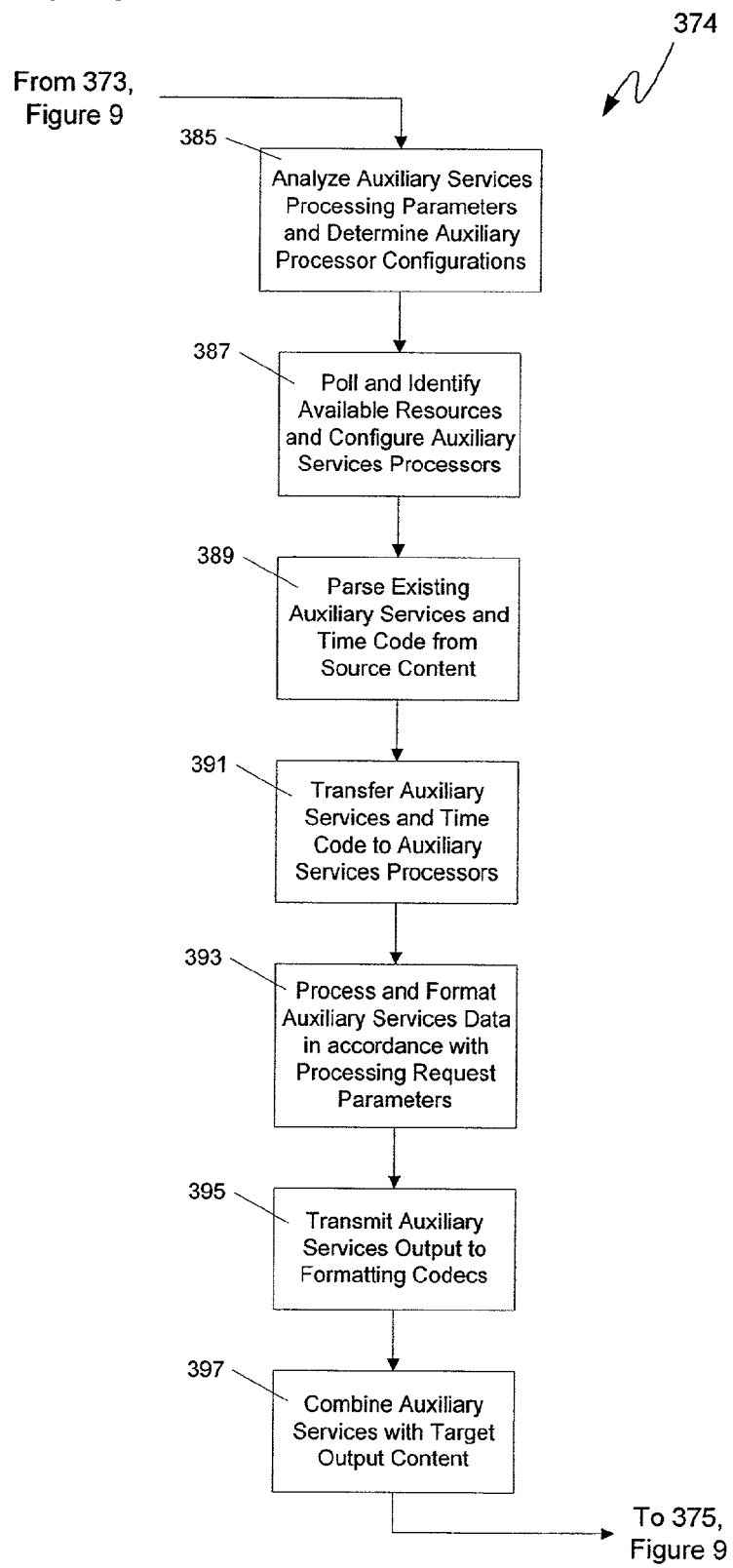
FIG. 10 shows a flowchart describing a method of processing auxiliary services that may accompany source and/or target content.

FIG. 10 shows the auxiliary services processing of routine 374 in more detail. If existing auxiliary services and/or newly established auxiliary services are to be combined with target output content, then routine 385 within one or more of the formatter processor 271 and/or formatting codecs 274 analyzes any auxiliary services processing request parameters that may be part of the coding and formatting request and determines the necessary configuration of one or more auxiliary services processors 276. Routine 387 within the formatter processor 271 may then poll available auxiliary processing resources and configure one or more auxiliary services processors 276 required to perform the requested processing operations. One or more formatting codecs 274 may parse, or separate, existing auxiliary services and time code data that may be combined with one or more source content files and/or transport streams, routine 389. Routine 391 may then transfer these auxiliary services as well as the source content time code data to one or more auxiliary services processors 276. Routine 391 may also transfer data from sources external to the codec and content formatter 270 that may be required to establish new auxiliary services to be combined with the target output content. These external sources may include the content acquisition server 400, the content delivery server 450, and the aggregator local storage 254. One or more auxiliary services processors 276 may then perform one or more processing and formatting operations on one or more sources of auxiliary services data in accordance with processing request parameters in order to output one or more target auxiliary services to be combined with target output content, routine 393. Routine 395, which may reside within the formatter processor 271 and/or one or more auxiliary services processors 276, may then transmit these output auxiliary services to one or more formatting codecs 274. Routine 397 may then be executed by one or more formatting codecs 274 to combine the auxiliary services with one or more target output content files and/or data streams. Processing is then continued with routine 375 as shown in FIG. 9 and as described above.

What is claimed is:

1. A method comprising:
   receiving content combined with data of at least one auxiliary service, the content received being in a first format;
   receiving, at a computing device, a request for the content, wherein the request includes an identification of a second format in which the content is requested and an identification of the at least one auxiliary service;
   separating the data of the at least one auxiliary service from the content in the first format;
   coding the content from the first format into the second format;
   combining the data of the at least one auxiliary service with the content in the second format; and
   outputting, responsive to the request, the content in the second format combined with the data of the at least one auxiliary service.

2. The method of claim 1, further comprising combining the data of the at least one auxiliary service and the content in the second format into a single file.

3. The method of claim 1, further comprising:
   parsing time code data from the content in the first format; and
   synchronizing the data of the at least one auxiliary service with the content in the second format using the time code data.

4. The method of claim 1, wherein the second format employs a different level of data compression from the first format.

5. The method of claim 1, wherein the data of the at least one auxiliary service comprises one or more of: closed captioning, descriptive video narration, alternative language audio, content rating, critical review information, device control, a future content schedule, untargeted advertising, targeted advertising, a text service, a data service, an interactive service, and content metadata.

6. The method of claim 1, wherein the content in the first format is received combined with data of a plurality of auxiliary services including the data of the at least one auxiliary service, the method further comprising:
   separating the data of the plurality of auxiliary services from the content in the first format.

7. The method of claim 1, wherein the request is received from a user terminal.

8. The method of claim 1, further comprising:
   polling resources capable of coding the content into the second format from the first format;
   identifying one or more available resources based on the polling; and
   utilizing at least one of the one or more available resources to code the content from the first format into the second format.

9. The method of claim 1, further comprising combining the data of the at least one auxiliary service and the content in the second format into a single transport stream.

10. A system comprising:
    one or more processors configured with software that when executed by the one or more processors causes the system to:
    receive content combined with data of at least one auxiliary service, the content received being in a first format;
    receive a request for the content, wherein the request includes an identification of a second format;
    separate the data of the at least one auxiliary service from the content in the first format;
    code the content from the first format into the second format;
    combine the data of the at least one auxiliary service with the content in the second format; and
    output, responsive to the request, the content in the second format combined with the data of the at least one auxiliary service.

11. The system of claim 10, wherein the software, when executed by the one or more processors, causes the system to:
    combine the data of the at least one auxiliary service and the content in the second format into a single file.

12. The system of claim 10, wherein the content in the first format is received combined with data of a plurality of auxiliary services including the data of the at least one auxiliary service, and wherein the software, when executed by the one or more processors, causes the system to:
    separate the data of the plurality of auxiliary services from the content in the first format.

13. The system of claim 10, wherein the data of the at least one auxiliary service comprises one or more of closed captioning, descriptive video narration, alternative language audio, content rating, critical review information, device control, a future content schedule, untargeted advertising, targeted advertising, a text service, a data service, an interactive service, and content metadata.

14. The system of claim 10, wherein the software, when executed by the one or more processors, causes the system to:

poll resources capable of coding the content from the first format into the second format;

identify one or more available resources based on the polling; and utilize at least one of the one or more available resources to code the content from the first format into the second format.

15. The system of claim 10, wherein the software, when executed by the one or more processors, causes the system to:
combine the data of the at least one auxiliary service and the content in the second format into a single transport stream.

16. The system of claim 10, wherein the software, when executed by the one or more processors, causes the system to:
parse time code data from the content in the first format; and
synchronize the data of the at least one auxiliary service with the content in the second format using the time code data.

17. The system of claim 10, wherein the second format is identified in the request by a set of parameters, which includes a parameter indicating a level of data compression.

18. A system comprising:
a plurality of user terminals; and
an apparatus comprising one or more processors configured with software, that when executed by the one or more processors, causes the apparatus to:
receive content combined with data of at least one auxiliary service, the content received being in a first format;
receive, from a first user terminal of the plurality of user terminals, a request for content, the request including an identification of a second format; and
responsive to the request:
separate the data of the at least one auxiliary service from the content in the first format,
code the content from the first format into the second format, and
output the content in the second format combined with the data of the at least one auxiliary service.

19. The system of claim 18, wherein the plurality of user terminals comprises at least one of a set top terminal and a personal computer terminal.

20. The system of claim 18, further comprising:
a second apparatus comprising one or more second processors configured with second software, that when executed by the one or more second processors, causes the second apparatus to provide, to the apparatus, at least one of the content in the first format and a reference to the content stored in the first format at a location remote from the apparatus.

* * * * *

UNITED STATES PATENT AND TRADEMARK OFFICE
CERTIFICATE OF CORRECTION

PATENT NO. : 8,578,410 B2
APPLICATION NO. : 12/971033
DATED : November 5, 2013
INVENTOR(S) : William D. Swart et al.

Page 1 of 1

It is certified that error appears in the above-identified patent and that said Letters Patent is hereby corrected as shown below:

In the Specification

Column 7, Detailed Description, Line 57-58:
Please delete "infonation" and insert --information--

Signed and Sealed this
Seventeenth Day of February, 2015

Michelle K. Lee
*Deputy Director of the United States Patent and Trademark Office*